(12) United States Patent
Huomo et al.

(10) Patent No.: US 8,909,144 B2
(45) Date of Patent: *Dec. 9, 2014

(54) COMMUNICATIONS DEVICES COMPRISING NFC COMMUNICATORS

(71) Applicant: Broadcom Innovision Limited, Cambridge (GB)

(72) Inventors: Heikki Huomo, Cirencester (GB); Ian Keen, Yateley (GB); Marc Borrett, Cirencester (GB)

(73) Assignee: Broadcom Europe Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/974,414

(22) Filed: Aug. 23, 2013

(65) Prior Publication Data

US 2013/0344807 A1 Dec. 26, 2013

Related U.S. Application Data

(63) Continuation of application No. 11/640,439, filed on Dec. 15, 2006, now Pat. No. 8,538,332.

(51) Int. Cl.
*H04B 5/00* (2006.01)
*G06Q 20/32* (2012.01)
*G06Q 20/04* (2012.01)

(52) U.S. Cl.
CPC .......... *H04B 5/0031* (2013.01); *G06Q 20/3226* (2013.01); *H04B 5/0056* (2013.01); *G06Q 20/3229* (2013.01); *G06Q 20/045* (2013.01); *H04B 5/0081* (2013.01); *H04B 5/00* (2013.01); *G06Q 20/3278* (2013.01)
USPC ........................................................ 455/41.1

(58) Field of Classification Search
CPC ....... H04W 4/008; H04B 5/00; H04B 5/0056; H04B 5/02
USPC ......................................................... 455/41.1
See application file for complete search history.

(56) References Cited

U.S. PATENT DOCUMENTS 5,394,367 A 2/1995 Downs et al.
5,467,081 A 11/1995 Drews et al.
(Continued)

FOREIGN PATENT DOCUMENTS

CA 2 294 721 A1 12/1998
EP 0 820 178 A2 1/1998
(Continued)

OTHER PUBLICATIONS

International Search Report and Written Opinion of the International Searching Authority directed to related International Patent Application No. PCT/GB2007/004693, mailed Nov. 3, 2008; 23 pages.

(Continued)

*Primary Examiner* — April G Gonzales
(74) *Attorney, Agent, or Firm* — Sterne, Kessler, Goldstein & Fox P.L.L.C.

(57) ABSTRACT

A communications device configured to couple with a near field RF communicator, in near field range, to enable communication of data by modulation of a magnetic field. The communications device also including a secure element, having a plurality of memory areas with differing levels of access, configured to provide secure data storage for transaction data, wherein the levels of access are differentiated by a degree to which the plurality of memory areas are programmable, writable and modifiable. Further, the communications device includes a controller configured to read the transaction data from the at least one secure element, and to cause a modulator to modulate the RF signal in accordance with transaction data read from the secure element so as to communicate the read transaction data to the near field RF communicator as proof of the transaction to enable an action related to the transaction to be carried out.

20 Claims, 15 Drawing Sheets

(56) References Cited

U.S. PATENT DOCUMENTS

| | | | |
|---|---|---|---|
| 5,714,741 A | 2/1998 | Pieterse et al. | |
| 6,216,227 B1 | 4/2001 | Goldstein et al. | |
| 6,400,965 B1 | 6/2002 | Phillips et al. | |
| 6,859,650 B1 | 2/2005 | Ritter et al. | |
| 7,757,958 B2* | 7/2010 | Ito | 235/492 |
| 7,881,665 B2* | 2/2011 | Symons | 455/41.1 |
| 2002/0147029 A1 | 10/2002 | Wu | |
| 2003/0057279 A1* | 3/2003 | Uozumi et al. | 235/451 |
| 2004/0215964 A1 | 10/2004 | Barlow et al. | |
| 2006/0124755 A1 | 6/2006 | Ito | |
| 2006/0148404 A1* | 7/2006 | Wakim | 455/41.2 |
| 2006/0198364 A1* | 9/2006 | Fujii | 370/352 |
| 2007/0026826 A1* | 2/2007 | Wilson | 455/130 |
| 2008/0039134 A1 | 2/2008 | Hattori et al. | |
| 2009/0312011 A1* | 12/2009 | Huomo et al. | 455/426.1 |
| 2010/0009627 A1* | 1/2010 | Huomo | 455/41.1 |
| 2012/0196529 A1 | 8/2012 | Huomo et al. | |

FOREIGN PATENT DOCUMENTS

| | | |
|---|---|---|
| EP | 0 969 426 A1 | 1/2000 |
| EP | 1 450 297 A1 | 8/2004 |
| EP | 701 559 A2 | 9/2006 |
| EP | 1 770 534 A1 | 4/2007 |
| EP | 1 798 867 A2 | 6/2007 |
| EP | 1 814 239 A2 | 8/2007 |
| GB | 2 365 699 A | 2/2002 |
| GB | 2 422 517 A | 7/2006 |
| GB | 2 427 330 A | 12/2006 |
| GB | 2 433 386 A | 6/2007 |
| WO | WO 99/60713 A1 | 11/1999 |
| WO | WO 03/081832 A2 | 10/2003 |
| WO | WO 2004/099921 A2 | 11/2004 |
| WO | WO 2005/093667 A1 | 7/2005 |
| WO | WO 2005/069236 A1 | 10/2005 |
| WO | WO 2005/098769 A1 | 10/2005 |
| WO | WO 2005/121975 A1 | 12/2005 |
| WO | WO 2006/095186 A1 | 9/2006 |
| WO | WO 2007/045732 A1 | 4/2007 |

OTHER PUBLICATIONS

"Identification cards—Contactless integrated circuit(s)—Proximity cards—Part 2: Radio frequency power and signal interface," ISO/IEC FCD 14443-2, Mar. 26, 1999; pp. 1-15.

Near Field Communication Interface and Protocol (NFCIP-1), Standard ECMA 340, $2^{nd}$ Edition, Dec. 2004; 65 pages.

Near Field Communication Wired Interface (NFC-WI), Standard ECMA-373, $1^{st}$ Edition, Jun. 2006; 25 pages.

Non-Final Rejection mailed Aug. 29, 2011 for U.S. Appl. No. 11/640,439, filed Dec. 15, 2006; 17 pages.

Final Rejection mailed Feb. 15, 2012 for U.S. Appl. No. 11/640,439, filed Dec. 15, 2006; 19 pages.

Notice of Allowance mailed May 9, 2013 for U.S. Appl. No. 11/640,439, filed Dec. 15, 2006; 13 pages.

* cited by examiner

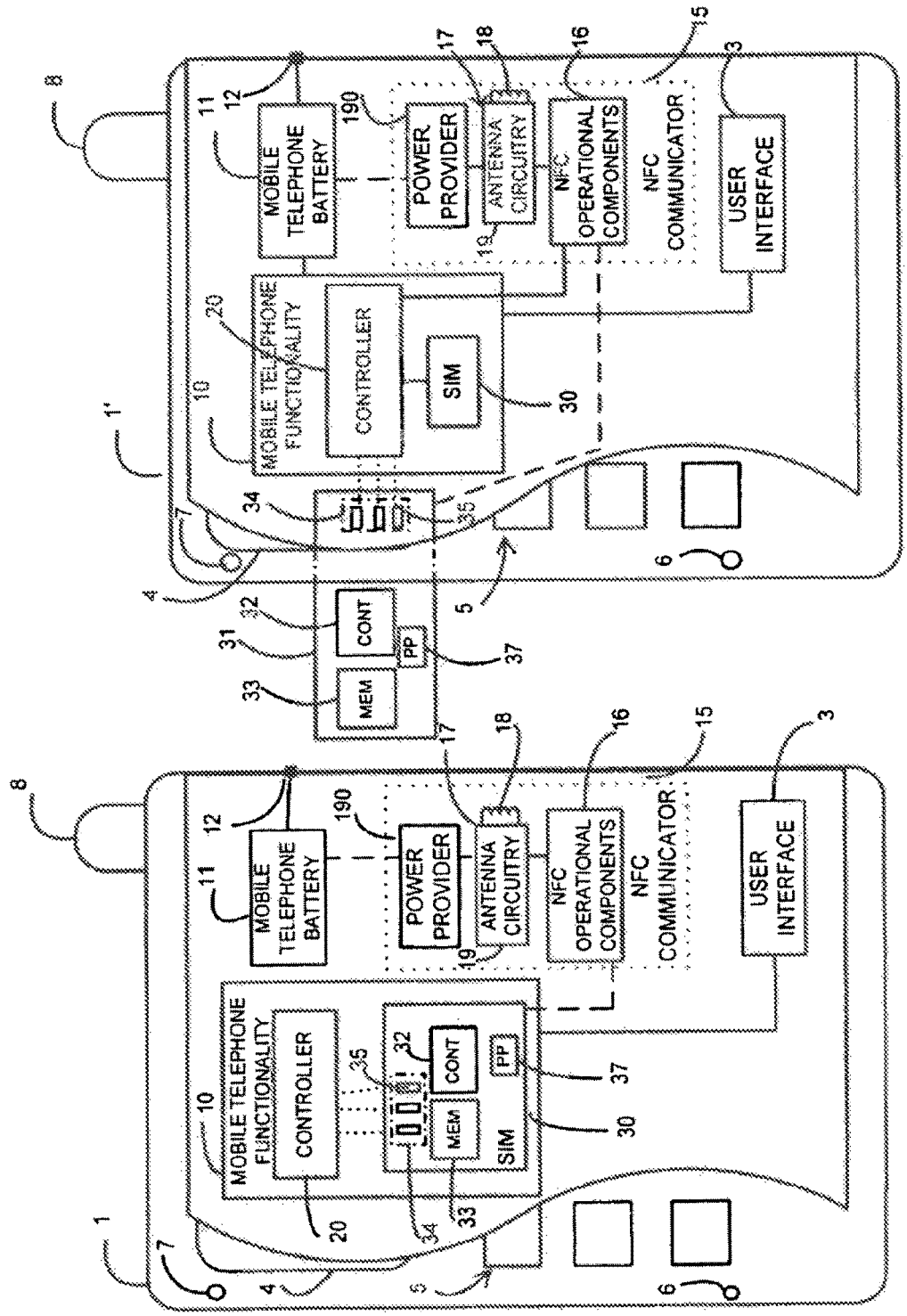

| Command | | Operation (7 bits) | | | | | | | Comment |
|---|---|---|---|---|---|---|---|---|---|
| | | MSB | | | | | | LSB | (all commands are independent) |
| | | b7 | b6 | b5 | b4 | b3 | b2 | b1 | |
| REQA | 26 | 0 | 1 | 0 | 0 | 1 | 1 | 0 | Request command, type A |
| WUPA | 52 | 1 | 0 | 1 | 0 | 0 | 1 | 0 | Wake-up, type A |
| RID | 78 | 1 | 1 | 1 | 1 | 0 | 0 | 0 | Read-ID -- Use to read metal-mask ROM and UID0-3 from block0 |
| RALL | 00 | 0 | 0 | 0 | 0 | 0 | 0 | 0 | Read All (all bytes) |
| READ | 01 | 0 | 0 | 0 | 0 | 0 | 0 | 1 | Read (a single byte) |
| WRITE-E | 53 | 1 | 0 | 1 | 0 | 0 | 1 | 0 | Write-with-erase (a single byte) |
| WRITE-NE | 1A | 0 | 0 | 0 | 1 | 1 | 1 | 0 | Write-no-erase (a single byte) |

FIG. 8

Command-response summary table

Greyed out frames are dummy frames – their date content is 'don't care' as they are only required for the device internal logic

| Command | Command (Multiple frames to the device) | | | | | | | Response (Single frame from the device) | | | | | |
|---|---|---|---|---|---|---|---|---|---|---|---|---|---|
| REQA | REQA | | | | | | | ATQA0 | ATQA1 | | | | |
| WUPA | WUPA | | | | | | | ATQA0 | ATQA1 | | | | |
| RID | RID | ADD | DAT | UID0 | UID1 | UID2 | UID3 | CRC1 | CRC2 | HR0 | HR1 | UID0 | UID3 CRC1 CRC2 |
| RALL | RALL | ADD | DAT | UID0 | UID1 | UID2 | UID3 | CRC1 | CRC2 | HR0 | HR1 | UID0 | DATe CRC1 CRC2 |
| READ | READ | ADD | DAT | UID0 | UID1 | UID2 | UID3 | CRC1 | CRC2 | DAT | | | |
| WRITE-E | WRITE-E | ADD | DAT | UID0 | UID1 | UID2 | UID3 | CRC1 | CRC2 | ADD | DAT | CRC1 | CRC2 |
| WRITE-NE | WRITE-NE | ADD | DAT | UID0 | UID1 | UID2 | UID3 | CRC1 | CRC2 | ADD | DAT | CRC1 | CRC2 |
|  |  |  |  |  |  |  |  |  |  | ADD | DAT | CRC1 | CRC2 |

FIG. 9

COMMUNICATIONS DEVICES COMPRISING NFC COMMUNICATORS

CROSS-REFERENCE TO RELATED APPLICATIONS

This application is a continuation of U.S. patent application Ser. No. 11/640,439 filed Dec. 15, 2006, now allowed. Each of the above referenced applications is hereby incorporated herein by reference in its entirety.

FIELD OF THE INVENTION

This invention relates to communications devices comprising NFC communicators.

BACKGROUND OF THE INVENTION

Near field RF (radio frequency) communication is becoming more and more commonplace as is the use of such technology to transfer data. Near field RF communicators communicate through the modulation of the magnetic field (H field) generated by a radio frequency antenna. Near field RF communication thus requires an antenna of one near field RF communicator to be present within the alternating magnetic field (H field) generated by the antenna of another near field RF communicator by transmission of an RF signal (for example a 13.56 Mega Hertz signal) to enable the magnetic field (H field) of the RF signal to be inductively coupled between the communicators. The RF signal may be modulated to enable communication of control and/or other data. Ranges of up to several centimeters (generally a maximum of 1 meter) are common for near field RF communicators.

NFC communicators are a type of near field RF communicator that is capable in an initiator mode of initiating a near field RF communication (through transmission or generation of an alternating magnetic field) with another near field RF communicator and is capable in a target mode of responding to initiation of a near field RF communication by another near field RF communicator. The term "near field RF communicator" includes not only NFC communicators but also initiator near field RF communicators such as RFID transceivers or readers that are capable of initiating a near field RF communication but not responding to initiation of a near field RF communication by another near field RF communicator and target or responding near field RF communicators such as RFID transponders or tags that are capable of responding to initiation of a near field RF communication by another near field RF communicator but not of initiating a near field RF communication with another near field RF communicator. Hence NFC communicators can act as both RFID transceivers and RFID transponders and are able to communicate with other NFC communicators, RFID transceivers and RFID transponders.

There are several standards in existence which set out certain communication protocols and functional requirements for RFID and near field RF communications. Examples are ISO/IEC 14443, ISO 15693, ISO/IEC 18092 and ISO/IEC 21481.

There are many applications areas for near field communication that involve transactions with another party or service provider. Such transactions may or may not involve a financial component and may or may not involve a product. One application area is the financial transaction area which involves payment for products such as goods and services. Another transaction area (that may or may not involve a financial element) is provision of products such as access or entry permits such as, for example, tickets or passes.

SUMMARY OF THE INVENTION

An embodiment provides a device having an NFC communicator and a secure element where communication of secure data from the secure element is effected by the NFC communicator in accordance with its protocols so that the manner in which the secure data is made secure (for example a manner of encryption) is not known to and is not relevant to the NFC communicator, but rather the NFC communicator is operable to supply the secure data via NFC communication to a near field RF communicator which may either have the functionality to decrypt the secure data or more likely will supply the secure data to another device which has that capability. This means that the NFC communicator does not need to be a secure or trusted device, only the secure element and the device that decrypts communicated secure data need to be trusted devices. This enables a user to carry out a transaction with a third party via near field communication which should not depend upon the particular NFC communicator to which they have access, the particular transaction or the particular third party involved in that communication, thereby enabling interoperability to maintain a consistent and viable user experience. An embodiment may also provide flexibility and backwards compatibility with existing systems and devices because the NFC communication is not reliant on the type of secure element or the manner in which it secures its data. Rather the NFC communicator communicates the secured data to a near field RF communicator without any knowledge of these features of the secure element.

An embodiment provides a communications device with a NFC communicator having a coupler to couple with a coupler of a near field RF communicator in near field range to enable communication of data between the communicators by modulation of a magnetic field, a demodulator to extract modulation from a modulated signal coupled to the coupler and a modulator to modulate an RF signal in accordance with data to be communicated by the NFC communicator. The device also has at least one secure element separate from the NFC communicator to provide secure data storage for transaction data representing or relating to a transaction. A controller controls operation of the NFC communicator, reads transaction data from the at least one secure element and causes the modulator to modulate an RF signal in accordance with transaction data read from the at least one secure element so as to communicate the read transaction data to a near field RF communicator in near field range as proof of the transaction to enable an action related to the transaction to be carried out.

The transaction data may for example comprise at least one of: payment data; purchase data; product data; ticket data; reservation data.

An embodiment provides a device having a secure element to enable transfer of data from a memory store of the secure element directly or indirectly to an NFC communicator wherein such NFC communicator: is operable to communicate with an external near field RF communicator through modulation of a proximal H field; is operable to both initiate communication using the H field and to respond to communication using the H field where such communication is initiated by an external near field RF communicator, is controlled in accordance with instructions received from a controller (for example a microprocessor, microcontroller or reduced instruction set computer) that may be integral to the NFC communicator or within a larger host device or system; comprises a modulator to modulate a proximal H field generated by another or external near field RF communicator; comprises a demodulator to demodulate a received modulated RF signal from the other or external near field RF communicator; and wherein in operation as a result of communication with the other or external near field RF communicator, data from the secure element is transmitted to the other or external near field RF communicator.

In an embodiment an NFC communicator: is operable to communicate with an external near field RF communicator through modulation of a proximal H field; is operable to both initiate communication using the H field and to respond to communication using the H field where such communication is initiated by an external near field RF communicator; is controlled in accordance with instructions received from a controller (for example a microprocessor, microcontroller or reduced instruction set computer) that may be integral to the NFC device or comprised within a larger host device or system; comprises a modulator to modulate a proximal H field generated by another or external near field RF communicator; comprises a demodulator to demodulate a modulated RF signal received from another or external near field RF communicator, and wherein in operation data communicated by the NFC communicator is held either wholly or partially within a secure element separate from the NFC communicator, for example a SIM card, SD card or other secure memory storage.

In an embodiment, a mobile telephone or PDA is provided which: is operable to receive data from a secure element; comprises an NFC communicator; and has a processor to control transmission of data by the NFC communicator to another or external near field RF communicator, wherein the data being transferred is stored wholly or partially on the Secure element.

In an embodiment, a mobile telephone or PDA or laptop is provided which is operable to receive data from a secure element and is operable to transfer data to another or external near field RF communicator via an NFC communicator, the data to be transferred being stored wholly or partially on a secure element.

In an embodiment, a mobile telephone or PDA or laptop is provided which is operable to enable the viewing of at least some data stored on a secure element by the mobile telephone or PDA or laptop user and to enable deletion of data from the secure element by the mobile telephone or PDA or laptop user and wherein data on the secure element may be transmitted to another or external near field RF communicator via an NFC communicator within the mobile telephone or PDA.

In an embodiment, a secure element has compatibility with standards requirements and protocols whilst being cost effective and flexible to implement.

In an embodiment, a secure element, for example a SIM card, USIM card, WIM card, SWIM card, SD card, SMC card or other form of secure element, is operable to transfer data from its memory or data store to an external near field RF communicator through an NFC communicator. In a preferred embodiment the secure element provides a transport platform operable to enable an NFC communicator to communicate transport data in accordance with or compatible with ISO/IEC 14443. In an embodiment the secure element provides a platform operable to enable an NFC communicator to communicate data in accordance with or compatible with ISO/IEC 15693.

A secure element may be removable from or fixed or integrated within a larger device or host system, for example a mobile telephone, PDA, lap-top or other electrical device. As used herein "secure element" means any element which is capable of being used and is "trusted" to hold secure encrypted information and/or data, although not all of the data held by the secure element need be encrypted.

Generally, the secure data is transaction data providing or associated with details of a transaction. The secure data may also comprise access codes or authorization codes. As used herein a "transaction" may or may not be a financial transaction. A transaction may be a purchase of a product such as goods or services, a ticket or access pass such as a transport ticket, for example an airplane, train, underground, bus, tram, boat, etc. ticket, a ticket for an attraction such as a sporting or other entertainment event, a cinema or theatre ticket, a reservation or booking such as a hotel reservation, a hire car reservation, or a restaurant reservation, or a financial product such as a credit or debit card or monetary amount and so on. In an embodiment, transaction data stored by the secure element comprises transport data, more particularly data representing a product such as a transport ticket, a journey or payment for a journey. In an embodiment transaction data stored by the secure element comprises access data, more particularly data entitling the user of the NFC communicator to have access to a building, location or area.

An embodiment provides an electronic proof comprising a device as above, wherein the proof is provided by the transaction data which represents or is associated with at least one of: a transport ticket or pass which may be a single, return, multiple journey or season ticket for example; an entertainment ticket such as a cinema, theatre or sports ticket; a receipt such as a receipt for purchase of goods or services; an access pass; a permit; a reservation or booking such as a hotel reservation, a hire car reservation, or a restaurant reservation.

BRIEF DESCRIPTION OF DRAWINGS

Further features and advantages of the invention will become apparent from the following description of embodiments of the invention, given by way of examples only, which are made with reference to the accompanying drawings, in which:

FIGS. 1 and 2 show representational diagrams illustrating two different devices embodying the invention and comprising NFC communicators;

FIG. 8 shows an example of a command list of an NFC communicator while

FIG. 9 shows an example of a command-response summary table of an NFC communicator;

FIG. 14 shows a flow chart for illustrating operations carried out by a secure element near field reader and a device embodying the invention carrying a secure element storing transaction data such as ticket while

DETAILED DESCRIPTION

Figure 3:
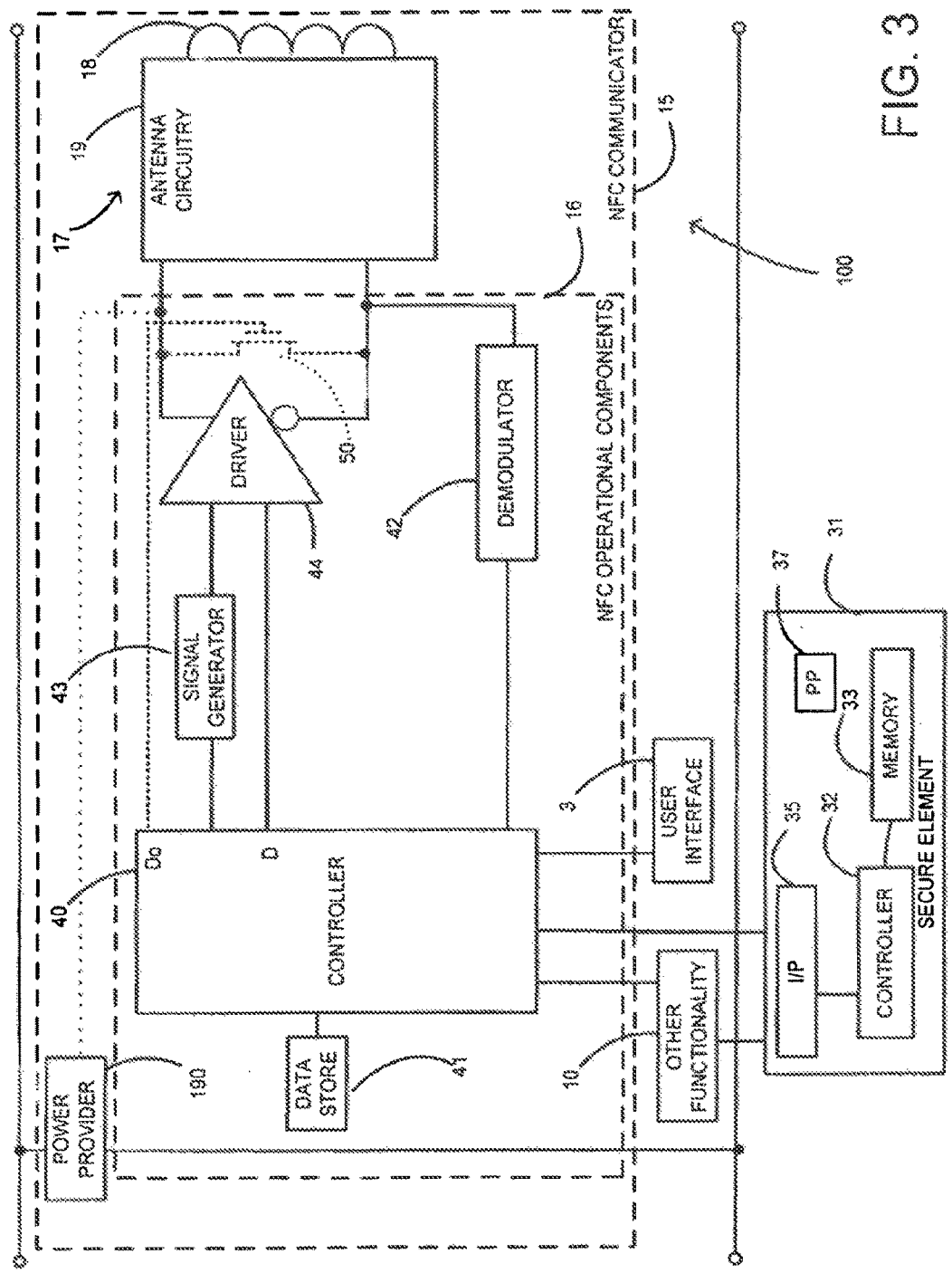
FIG. 3 shows a functional block diagram of a device embodying the invention.

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these. Also a device may be provided wholly or partially as an integrated circuit or collection of integrated circuits.

Referring now specifically to FIGS. 1 and 2, there are shown representational diagrams of devices 1 and 1' embodying the invention each comprising a secure element (30 in FIGS. 1 and 31 in FIG. 2) carrying encryption software or an encryption algorithm to ensure secure storage of data relating to a transaction such as, for example, a financial transaction or transactions such as a purchase of a product such as a service and/or or goods and/or information pertaining to or identifying the purchased service or product, for example ticket, permit, pass or access data and, separate from the secure element 30 or 31, an NFC communicator 15 to communicate data stored by the secure element 30 or 31 to another near field RF communicator (which may be another NFC communicator or could be an RFID reader, for example) by modulating the H (magnetic) field of an RF signal. The devices may also comprise additional functionality (device functionality) 10 and a user interface 3.

The secure element 30 or 31 is configured to be programmed or is already programmed with an operating system and one or more applications platforms to enable the secure element to load a corresponding application to enable a transaction to be effected such as at least one of payment for products such as goods and/or services and purchase or acquisition of ticket data, permit data, pass data or access data which requires communication of secure data. To this end the secure element is capable of encrypting and possibly also decrypting data. This may be achieved using, for example, a public-private key encryption system, with a private key or keys being securely held by the secure element. Neither a controller 20 of the device 1 or 1' nor the NFC communicator 15 needs to be configured to handle that particular type of transaction, but simply needs to be able to communicate data with the secure element 30 or 31. Thus neither the device nor the NFC communicator needs to have any information about the encryption algorithm used by the secure element or to have any other information concerning the manner of secure data provision; they simply need to be able to cause the secure data to be communicated by near field communication. The receiving near field RF communicator, or more likely a secure device associated therewith, will carry out the necessary decryption of the secure data. Therefore only the secure element and the receiving device that carries out decryption need to be devices trusted to effect secure data communication and storage. The types of transactions that can be handled by the device 1 or 1' are determined by the applications platform or platforms loaded onto the secure element 30 or 31 and these may be modified, updated or replaced by changing the secure element (where it is removable) and/or, where the secure element permits, reprogramming the secure element by downloading modified or replacement applications platforms via a communications system of the device 1 or by near field RF communication between the NFC communicator 15 and another near field RF communicator. The transaction data may be obtained in any of these ways. It may also be possible to obtain data, for example transaction or product data via the Internet and then download the product data by, for example, near field RF communication from a local outlet, for example in a manner similar to that in which cinema tickets can be purchased over the Internet and the ticket then printed out at the cinema when the credit card used to purchase the ticket is read. Backwards communications compatibility may be provided because the NFC communicator only has to be able to communicate with a near field RF communicator in accordance with NFC protocols and the manner in which the secure element secures data is not relevant to that communication.

In the examples shown in FIGS. 1 and 2, the secure element is coupled to a controller 20 of the device 1 to enable communication of data between the controller and the secure element 30 or 31 and the controller 20 is coupled to the NFC communicator 15 to enable communication of data between the controller 20 and the NFC communicator 15.

In FIGS. 1 and 2, the representations of the NFC communications enabled devices 1 and 1' have been shown partly cut-away and the functionality provided by the NFC communications enabled device 1 or 1' illustrated by way of a functional block diagram within the NFC communications enabled device 1 or 1'.

In the examples shown in FIGS. 1 and 2 the devices 1 and 1' are mobile telephones (cellular telephones or "cell phones"), although the device may be any suitable portable (user-carryable) user device having mobile communications such as a for example a portable computing device, for example a PDA or laptop having mobile communications facilities.

In the examples of FIGS. 1 and 2, the NFC communications enabled devices 1 and 1' have the usual features of a mobile telephone including mobile telephone functionality 10 comprising the controller 20 mentioned above (generally a processor or microprocessor with associated memory or data storage), for controlling operation of the mobile telephone, an antenna 8 for enabling connection to a mobile telecommunications network, and a user interface 3 with a display 4, a keypad 5, a microphone 6 for receiving user voice input and a loudspeaker 7 for outputting received audio to the user. The mobile telephone also has a chargeable battery 11 coupled to a charging socket 12 via which a mains adapter (not shown) may be connected to enable charging of the battery 11.

In addition, as mentioned above, the NFC communications enabled devices 1 and 1' each have an NFC communicator 15.

Each NFC communicator 15 comprises NFC operational components 16 for, as will be described below, enabling control of the NFC functionality and generation, modulation and demodulation of an RF signal. Each NFC communicator 15 also comprises a coupler 17 comprising an inductor or coil in the form of an antenna 18 and antenna circuitry 19 to generate an RF signal at, for example 13.56 MHz. The couplers 17 enable inductive coupling of an alternating magnetic field (H field) generated by the antenna of one near field RF communicator by transmission of an RF signal (for example a 13.56 Mega Hertz signal) to the antenna of another near field RF communicator when that antenna is within the near field of the RF signal generated by the one near field RF communicator 15.

In each of FIGS. 1 and 2, the NFC communicator 15 is coupled to the mobile telephone functionality 10 to enable data and/or control commands to be sent between the NFC communicator and the host device and to enable user input to the NFC communicator. Communication between the user interface 3 and the NFC communicator 15 is via the host device functionality 10.

Each NFC communicator 15 also comprises a power provider 190. The power providers 190 may be power supplies within the host device or specific to the NFC communicators 15, for example a button cell battery, or other small battery. As another possibility or additionally as shown by dashed lines in FIGS. 1 and 2, the power providers 190 may simply comprise a coupling to derive power from the corresponding device battery 11.

In the examples shown in FIGS. 1 and 2, the secure elements 30 and 31 are programmed with or programmable with an operating system and one or more applications platforms applications so as to be capable of encrypting transaction data and storing encrypted transaction data (for example ticket data, access data, purchase data) in accordance with that applications platform. Depending upon the application, the secure element may also be capable of decrypting encrypted data. The encryption system may be a public-private key encryption system in which case the secure element will hold a private key or keys. Alternatively the encryption system may be based on a secure algorithm in which case the secure element will hold the secure algorithm. To this end the secure elements 30 and 31 each have a controller (CONT) 32 (which may be a microprocessor, microcontroller or state machine, for example) which controls the functionality of the secure element in accordance with its operating systems and the installed applications platform or platforms and a data or memory store (MEM) 33, generally both provided by an integrated circuit. The memory store 33 may be any suitable type of memory or combination of types of memory but preferably comprises non-volatile memory, for example EEPROM or flash memory (or battery-backed up volatile memory) for data that requires long term storage such as the operating system, the applications platform(s), transaction data and so on. The memory 33 may include volatile memory for data that is only required while power is supplied to the secure element.

The secure element 30 or 31 also has a coupling interface 34 comprising one or more coupling elements 35 which may be electrical contact elements but could be wireless or contactless coupling elements, for example capacitive, inductive or electromagnetic coupling elements. The coupling elements may, for example, be in compliance with ISO 7816. The secure element 30 or 31 also has a power provider (PP) 37 which may be a power supply such as a battery or cell within the secure element or may simply be a coupling to a power supply of the device 1' or the NFC communicator.

The processing power provided by the secure element 30 or 31 will depend on the particular secure element and how it interacts with the controller of the device 1 or 1' or the NFC controller. For example, the secure element may carry out only limited processing specific to the applications software, for example encryption and/or decryption of secure data and other processing may be carried out by the controller 20 or the NFC controller.

In the example shown in FIG. 1, the secure element 30 is provided by the SIM (Subscriber Identity Module) or USIM (Universal Subscriber Identity Module) of the mobile telephone while in the example shown in FIG. 2 the secure element 31 is an external memory device receivable in a memory slot of the mobile telephone, for example a SD (Secure Digital) card or miniSD card.

FIGS. 1 and 2 thus show two different examples of devices in accordance with the invention. In the example shown in FIG. 1 the secure element 30 comprises a SIM card which may be provided already in place in the mobile telephone or is inserted prior to activation of the mobile telephone. The SIM card remains in place during mobile telephone operation and is not generally removed by the user. The SIM card has connections (not shown) to other functionality within the mobile telephone and as with the SD card interfaces to the mobile telephone controller 20. In contrast, in the example shown in FIG. 2, the secure element 31 comprises a removable secure element such as an SD card and a user will insert the secure element 31 into the mobile telephone (as and when the user wishes to use the data stored on the secure element or wishes to provide for additional data storage), so that the contact elements of the secure element enable the secure element to interface with the mobile telephone controller 20 and generally also to derive operating power from the mobile telephone power supply 11.

The secure element may however be any appropriate storage element having processing capability to enable the secure element 30 or 31 to communicate (receive and send) secure data (that is encrypted data) and to store data in a secure encrypted manner to inhibit reading of or tampering with the secure data by an unauthorized device or person or unauthorized functionality. The secure element may also be able to communicate and store unencrypted data, such as data that is freely publicly available or user data that the user does not consider to be private data.

Other examples of possible secure elements are encrypted smart cards, memory cards, encrypted multi-media cards, WIM (WAP Identity Module or Wireless Identity Module) cards, SWIM (Subscriber WAP Identity Module) cards, SMC (Smart Media Card) card or any other form of secure element that is capable of storing data in a secure manner and communicating that secure data with an external near field RF communicator via an NFC communicator.

FIG. 3 shows a functional block diagram of an NFC communications enabled device 100 (such as the mobile telephone shown in FIG. 2 that is capable of receiving a secure element in addition to its SIM card) to illustrate in greater detail one way in which the NFC operational components of an NFC communications enabled device embodying the invention may be implemented.

As described above, an NFC communications enabled device comprises an NFC communicator 15 having NFC operational components 16, an inductive coupler 17 with an antenna 18 and antenna circuitry 19 and a power provider 190. As discussed above, the power provider 190 may be any one or more of: a coupling to a power supply within the host device; a power supply specific to the NFC communicator 15, for example a button cell battery, or other small battery. As another possibility or additionally as indicated by the dotted line in FIG. 3, the power provider 190 may derive a power supply from a signal inductively coupled to the inductive coupler 17. In the interests of simplicity, power supply couplings from the power provider 190 to other components are not shown in FIG. 3.

As shown in FIG. 3, the NFC communications enabled device 100 has other functionality 10 (which may be the mobile telephone functionality described above with reference to FIG. 2) and a user interface 3.

The NFC communicator 15 has a controller 40 to control overall operation of the NFC communicator either alone or in conjunction with the controller 20 of the device 100 and an associated data store 41 to store data (information and/or control data) to be transmitted from and/or received by the NFC communications enabled device. The controller 40 may be, for example, a microprocessor, for example a RISC processor or other microprocessor or a microcontroller or a state machine. Program instructions for programming the controller 40 and/or control data for communication to another near field RF communicator may be stored in an internal memory of the controller and/or the data store 41.

The NFC operational components 15 also have a demodulator 42 coupled between the coupler 17 and the controller 40 to demodulate a modulated RF signal inductively coupled to the coupler 17 from another near field RF communicator in near field range and to supply the thus-extracted data to the controller 40 for processing. In addition the NFC operational components 15 have components to enable modulation of an RF signal to allow data to be communicated to another near field RF communicator in near field range of the NFC communicator 15. As shown in FIG. 3, these components comprise a signal generator 43 coupled to one input of a differential driver 44 having its other input coupled to a data output D of the controller 40 to cause the differential driver 44 to output to the coupler 17 signals modulated by the data supplied from the data output D. As another possibility, as shown in dashed lines in FIG. 3, the NFC communicator controller 40 may, rather than transmit its own modulated RF signal, modulate an incoming RF signal coupled to the coupler 17 by switching off the signal generator 43 and supplying data on an output Do to the control gate of an FET transistor 50, as shown an insulated gate field effect transistor, coupled across an impedance (generally a capacitance (not shown)) of the antenna circuitry 19 so as to switch the transistor on and off in accordance with the data, thereby modulating the load on the antenna circuit in accordance with the transistor on-resistance.

The NFC communicator 15 may operate in an initiator mode (that is as an initiating near field RF communicator) or in a target mode (that is as a responding near field RF communicator), dependent on the mode to which the NFC communicator is set. The mode may be determined by the controller 40 or may be determined in dependence on the nature of a received near field RF signal. When in initiator mode, an NFC communicator generates its own RF signal and initiates communications with any compatible responding near field RF communicator capable of responding to the initiating NFC communicator (for example an NFC communicator in target mode or an RFID tag or transponder) that is in its near field (H field) range, while when in target mode an NFC communicator waits for a communication from a compatible initiating near field RF communicator (for example an NFC communicator in initiator mode or an RFID reader or initiator or transceiver). As thus used, compatible means operable at the same frequency and in accordance with the same protocols, for example in accordance with the protocols set out in various standards such as ISO/IEC 18092, ISO/IEC 21481, ISO/IEC 14443 and ISO/IEC 15693.

The NFC communicator may use any appropriate modulation scheme that is in accordance with the standards and/or protocols under which the NFC communicator operates Whether in initiator or target mode, the NFC communicator may communicate in accordance with an active or passive protocol. When using an active protocol an initiating NFC communicator will transmit its own RF field and following completion of its data communication turn off its RF field. The responding near field RF communicator (target) will then transmit its own RF field and data before again turning off the RF field and so on. When using a passive protocol an initiating NFC communicator will transmit and maintain its RF field throughout the entire communication sequence. In this latter case, the responding NFC communicator may use load modulation. The protocol used will depend on instructions received from the controller and the response received from a responding near field RF communicator.

The secure element 31 will be as described above and will generally communicate with the other functionality 10 (the controller of the mobile telephone in FIG. 2) of the device 100 but may also, as shown in FIG. 3, communicate with the controller 40 of the NFC communicator 15.

The block diagram shown in FIG. 3 would differ for the mobile telephone 1 shown in FIG. 1 only in that the secure element would be positioned within rather than externally of the other functionality 10.

The NFC communicator 15 may communicate data from at least one of: its own internal data store (if present); the data store 41; an internal data store of the mobile telephone host controller; another data store within the device 100. The NFC communicator 15 is also operable to enable data communication between the secure element 30 or 31 and another near field RF communicator external to the device via the NFC communicator 15. Depending upon the applications platform(s) installed on the secure element, data may simply be read from the secure element and communicated by the NFC communicator 15 to another near field RF communicator but may possibly also be supplied by another near field RF communicator to the NFC communicator 15 to be stored by the secure element. Where appropriate, for example where transaction data is being communicated, then the data being communicated will be secure data (that is encrypted).

Figure 4:
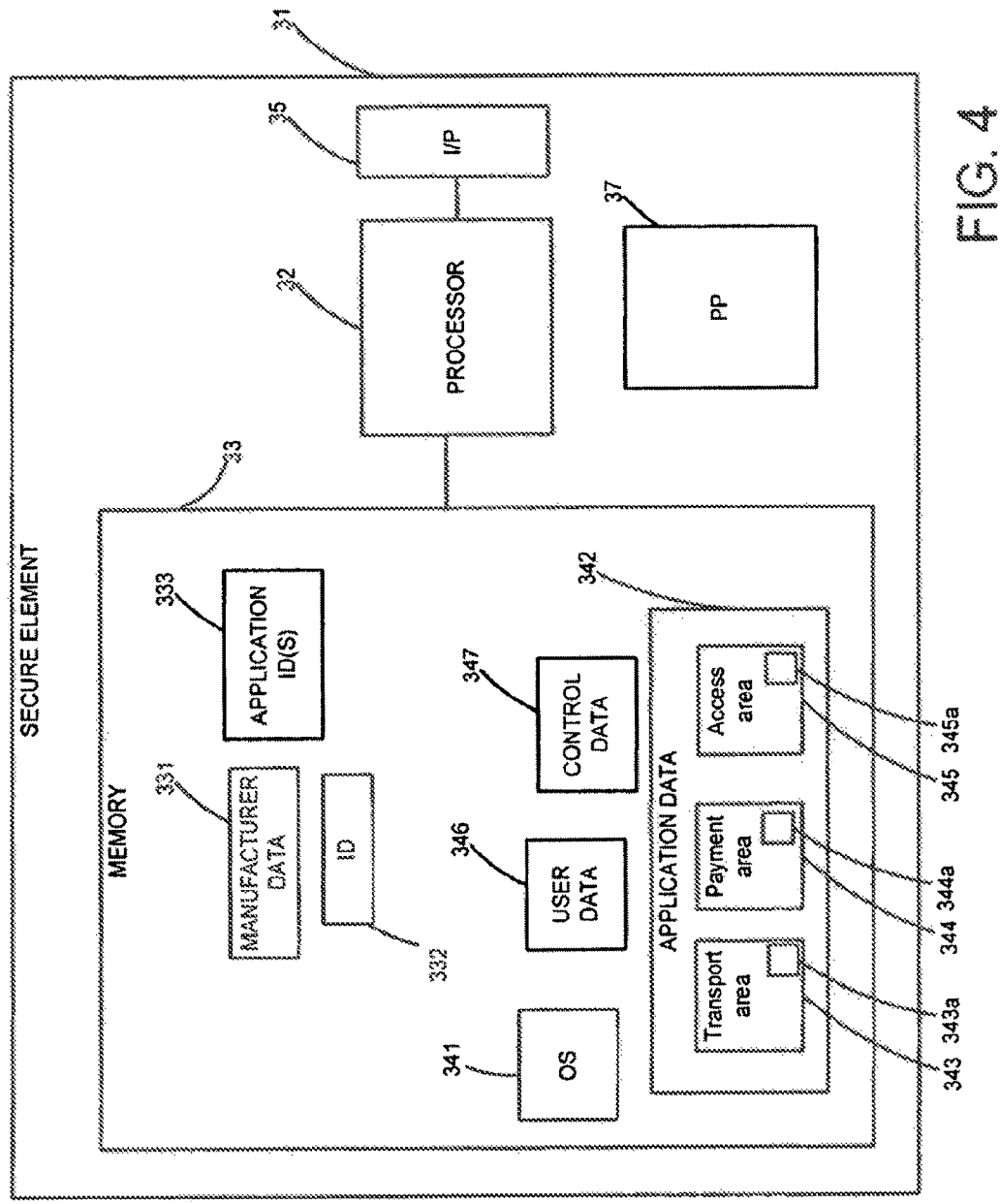
FIG. 4 shows a functional block diagram of an example of a secure element of a device embodying the invention.

FIG. 4 shows a block diagram of an example of a secure element 31 to illustrate the structure of the memory store 33 in greater detail. As shown in FIG. 4, the memory store has a manufacturer data region 331, a secure element ID data region 332, an application ID(s) data region 333, an operating system (OS) region 341 and an applications platforms region 342 which may have one or more of transport, payment and access platform areas 343 to 345, each of which will be associated with corresponding transaction data storage 343$a$, 344$a$ and 345$a$, respectively. The memory 340 may also include a user data region 346 and control data region 347. The nature of the data stored by the memory store 33 of the secure element will depend upon the application but will generally include data such as program data comprising commands and instructions of the applications platform(s) and operating system and content data such as data used by the program data, transaction data and user data.

The memory store 33 may comprise both non-volatile and volatile memory with the non-volatile memory being used for long term storage.

The different areas of memory may have different levels of access depending upon what or who is trying to access them. For example, some areas of memory may be programmable or writeable to only by certain authorized entities and other entities may only read data from those areas, while other areas may be writeable to once by some entities but writable to more than once by other entities and some areas may be freely writeable. For example the manufacturer data region 331 may be writeable to only by a manufacturer so that only the manufacturer can provide, replace or modify that data, the secure element ID data region 332 may be writeable to only by the provider of the secure element. The application ID(s) data region 333 may be writeable to only by the appropriate applications platform. Transaction data may be readable by a user of the device but not modifiable by that user. As another possibility, transaction data may be stored by the secure element so that it can be read by a user or deleted in its entirety by a user but not modified by a user. The actual levels of access provided for a particular region or area will depend upon the nature of the data stored and the secure element.

In this example, the secure element 31 has an operating system and one or more applications platforms each for handling a different type of transaction such as transport, payment and access transactions. Where flexibility is required of a secure element, then the overall operating system and one or more applications platforms may be stored in an area of memory that may be rewritten that is freely programmable memory. Where flexibility is not required, then the operating system and one or more applications platforms may be stored in an area of memory that may be programmed or written to only once. As another possibility, the operating system may be stored in an area of memory that may be programmed or written to only once, and the one or more applications platforms may be stored in freely programmable memory.

The access level for an area of memory may be controlled by software, for example the secure element operating system or applications platform. As another possibility, memory that is intended to be accessed only by a manufacturer may be one time programmable (OTP) programmable, in known manner, at mask level or by fusing of a fuse for example.

Generally the applications platform(s) will be stored in area(s) of memory for which the operating system encrypts data for security and from which the operating system only allows secure, encrypted (for example public private key encryption using a private key or keys or secure algorithm securely stored by the secure element) data communication. The user data area may have secure data and insecure data storage areas, for example. The type of memory provided for a particular purpose and the level of security (encryption) or lack of security for that data will depend upon the particular application of the secure element. Providing both one time programmable or writeable memory and freely programmable memory enables flexibility in commands (because modifications and/or replacement data and software may be downloaded to the freely programmable memory) and can also be used to generate additional security or functionality.

Figure 5:
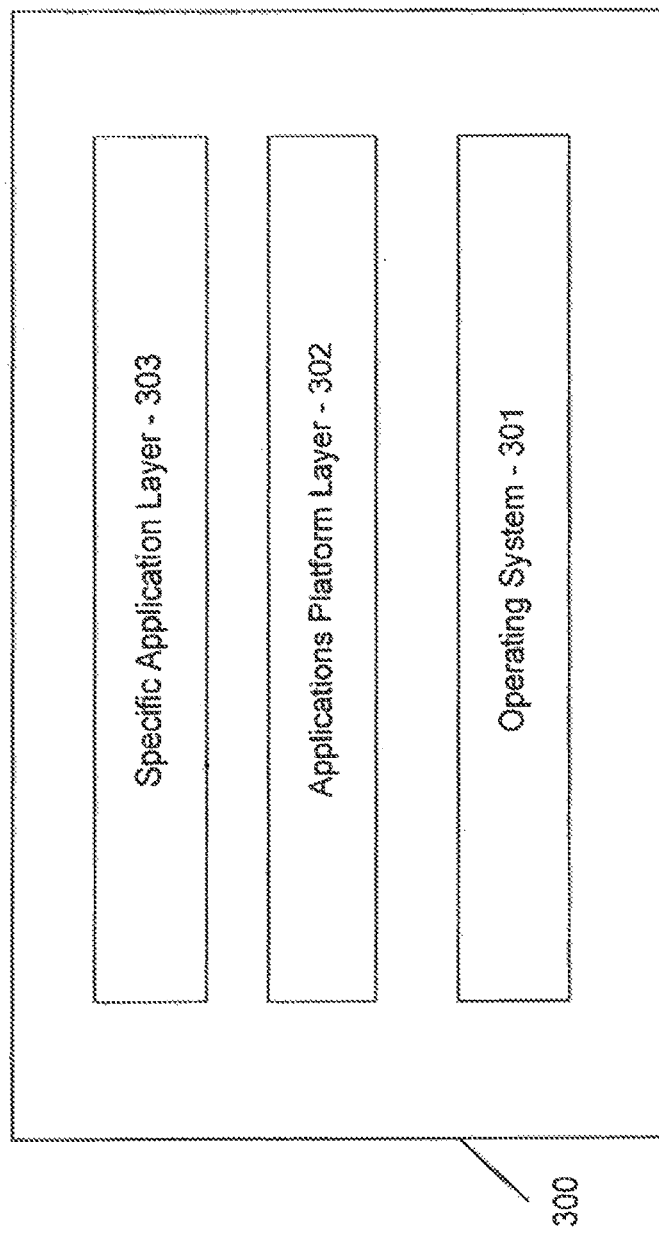
FIG. 5 shows a diagram to illustrate a protocol stack of a secure element.

In this example, as shown in FIG. 5, the secure element is configured to have a layer or protocol stack structure 300 such that the operating system 301 "sits beneath" an applications platform layer 302.

As an example the application platform layer 302 may provide at least one of a: 1) a banking applications platform defining payment protocols in accordance with banking standards and procedures (including credit card requirements, EMV specifications and the like); 2) a transport applications platform defining transport protocols in accordance with ISO/IEC 14443; 3) an access applications platform defining access protocols in accordance with ISO/IEC 15693. One or more other, for example proprietary, applications platforms may also be included, for example the supplier of the secure element may customize the secure element in some fashion or provide additional functionality. A specific applications platform (or possibly more than one if a transaction involves for example separate payment authorization) will be involved in each transaction. The applications platform layer 302 "sits beneath" a specific application layer 303 which will have, for each applications platform, corresponding instances of transactions using that applications platform and storing data in configurations specific to that instance. For example, where the applications platform layer 302 has a transport applications platform or protocol then the specific application layer 303 may store a distinct memory map for each transport transaction, where a transport transaction will usually be an electronic equivalent of a ticket or travel pass and may be a single, return, multiple journey, season ticket and so on. For example, for a particular transport applications platform or protocol then the specific application layer 303 may have data representing different types of purchased tickets, for example data for single journey tickets may be included together with data representing season tickets.

Figure 6:
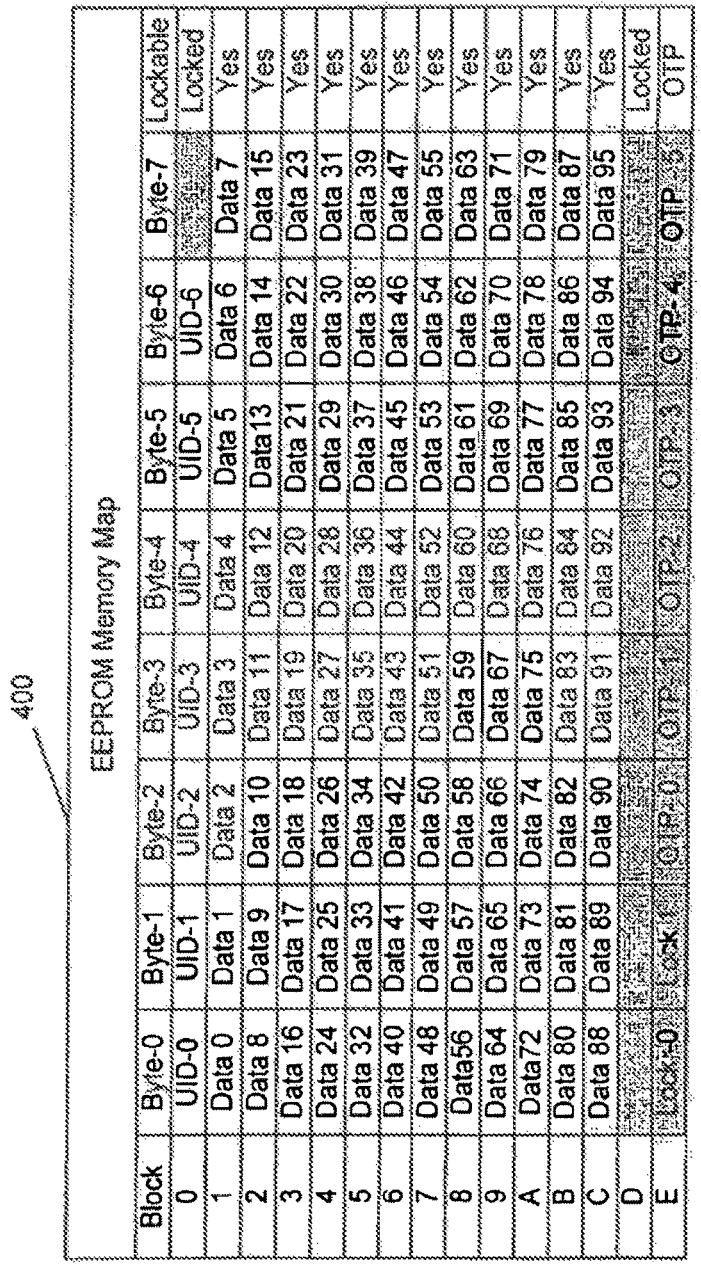
FIG. 6 shows an example of a memory map of a secure element.

In this example, the data for a transaction (such as a ticket) is stored as a memory map. An example memory map or array 400 is shown in FIG. 6. The memory map 400 illustrated in FIG. 6 represents an example of a limited use transport ticket compatible with ISO/IEC 14443A.

The memory map shown in FIG. 6 comprises as an example 120 bytes of EEPROM (Electrically Erasable Programmable Read Only Memory) arranged as 15 blocks of 8 bytes with each block being separately lockable generally by software as described above to prevent overwriting.

In the example shown in FIG. 6, the memory map also has a 2-byte header that forms part of the applications platform layer 303 (FIG. 5), is unique to that applications platform and cannot be altered once programmed, unless, in a preferred configuration, the entire memory map and thus the transaction (ticket in this example) in its entirety is deleted. The header identifies the specific transaction, for example a specific ticket.

In the example illustrated in FIG. 6, the block (or row) usage within the memory map is configured such that:

Block 0 is reserved for a 7 or 8 Byte UID (Unique Identification) which is programmed when the transaction is stored in the memory.

Blocks 1-C: (all 96 data bytes) are available to the transaction provider. These blocks can be programmed with, for example, application data, user data, control data. These blocks may also be written to or changed during operation of the NFC communicator, for example data may be written to these blocks as a result of communication between the NFC communicator and another near field RF communicator.

Block D: Least significant 4 bytes are reserved for use or future use by the secure element, its manufacturer or distributor. [0081] Block E: In this example, the least significant 2 bytes are used to store and control the block-lock status. The most significant 6 bytes are available for use by the transaction provider.

The programmable part or usable area of the memory map may be expanded to permit at least one of additional memory capability and additional command protocols or structures. For example the memory map may be extended to 192 bytes by adding 12 further 8 byte blocks or to 384 bytes by adding an additional 24 further 8 byte blocks.

It will of course be appreciated that this is only an example memory map and that the number of blocks and the number of bytes within a block may differ.

The operating system may be installed at manufacture of the secure element. As another possibility, the operating system may be downloaded via the NFC communicator from another near field RF communicator or from a tag or transponder onto which the operating system has been installed. As an example, such a preloaded secure element or transponder may be purchased or given away with the larger device. As another possibility, the operating system may be stored in a memory of the NFC communicator or device and downloaded to the secure element upon insertion into the device. As another possibility, the operating system may be downloaded, for example via the Internet, via communications functionality of the device, for example via the mobile telecommunications system in the case of the devices 1 and 1' described above. In one example the operating system may be provided as a JAVA applet via for example the mobile telecommunications network or near field communication. As another possibility, the Symbian operating system may be used. Where a mobile telephone is concerned, then a JAVA MIDlet may be used. Upgrades or modifications of the operating system may be supplied by any of these means. Where the operating system is stored in the memory store 33 during production or manufacture, then the operating system may require activation by a user of the device 1 or 1' prior to operation.

The applications platforms may be provided in any of the ways available for provision of the operating system. As an example, an applications platform may be provided as a JAVA (Registered Trade Mark of Sun Microsystems)-enabled applet where a JAVA based or compatible operating system is used.

The actual transactions may be provided in any of the ways available for the operating system and applications platforms. For example, the secure element may be pre-loaded with the transaction or, for example as a selling point, one or more transactions may be provided with the device 1 or 1' or other product or service and downloaded to the secure element from a near field RF communicator such as an RFID tag or transponder by near field RF communication or via another communications system available to the device, for example the mobile telecommunications network. Where the transaction is pre-loaded, then the UID (FIG. 6) will be programmed into the memory of the secure element during manufacture or production. Where the transaction is supplied at distribution or point of sale of the secure element (or host device), then the UID will be programmed in at that time. Where the transaction is a ticket such as a transport ticket, then the UID will be programmed when the ticket is purchased and downloaded to the secure element, i.e. at point or time of sale. As an example, a ticket may be purchased via the Internet and then downloaded to the device at a local outlet by, for example, near field RF communication or other communications channel available to the device.

There are various communication methods which may be used by an NFC communicator and before discussing operation of a device embodying the invention in relation to a transaction, further details of two examples will be given with reference to FIGS. 7 to 10.

Figure 7:
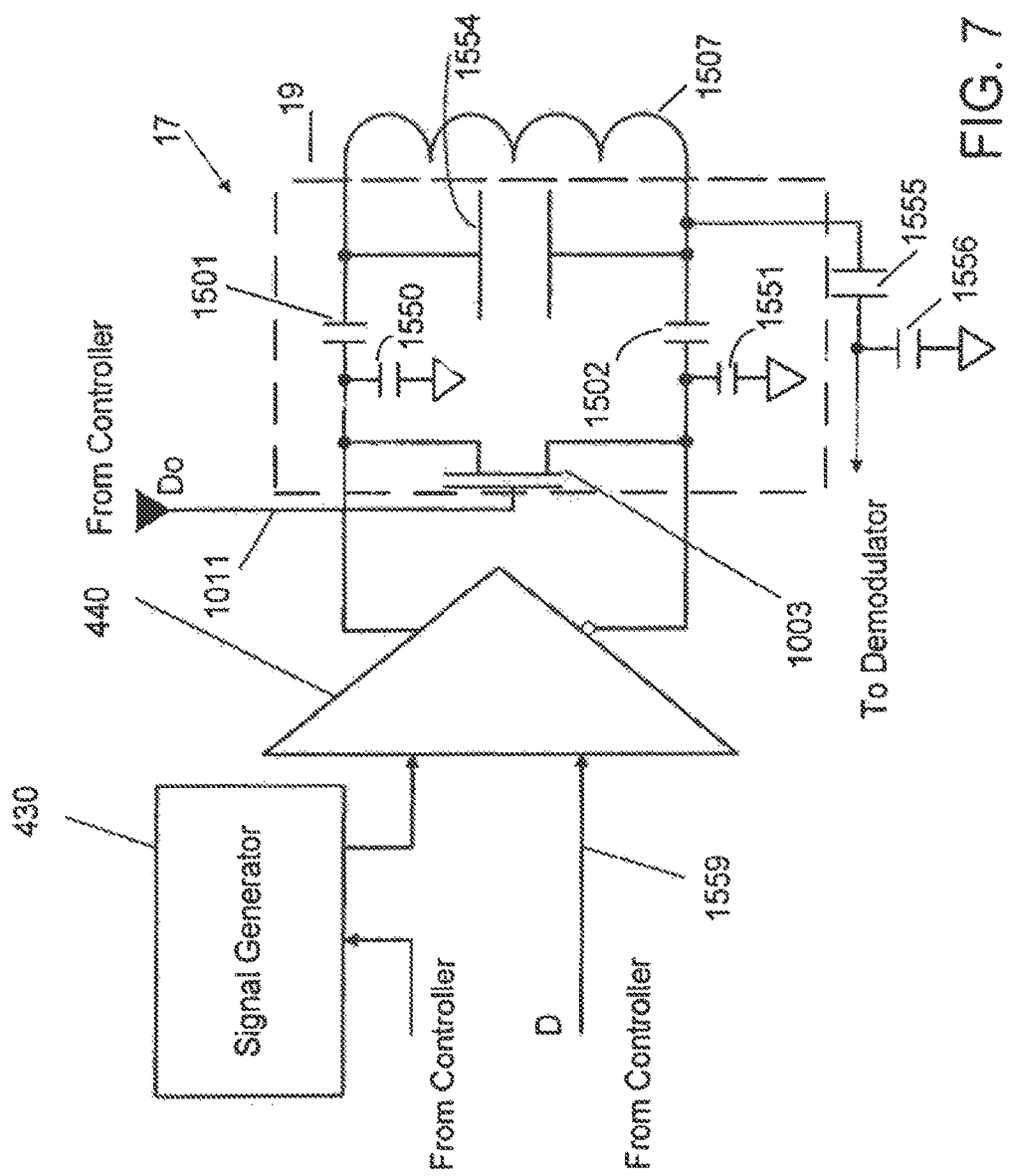
FIG. 7 shows part of the functionality of an NFC communicator to illustrate one example of antenna circuitry that may be used by the NFC communicator.

FIG. 7 shows details of part of an NFC communicator capable of a 'carrier generation' mode where the NFC communicator initiates (acts as the initiator) NFC communication and a "load modulation" mode where the NFC communicator responds to (acts as a target for) initiation of NFC communication by another NFC communicator.

In the example of FIG. 7, the antenna circuitry 19 consists of a tuned circuit comprising an antenna coil 1507 in parallel with a capacitor 1554. Capacitors 1501 and 1502 are coupled between respective ones of the ends of the antenna coil 1507 and respective ones of the outputs of the differential driver 440 and capacitors 1550 and 1551 couple capacitors 1501 and 1502, respectively, to earth (ground). The output from the antenna circuitry 19 to the demodulator (FIG. 3) is supplied via a capacitor 1555 coupled between a junction between the capacitor 1502 and the corresponding end of the antenna coil 1507 and the demodulator input, a capacitor 1556 being coupled between the capacitor 1555 and earth (ground).

In the 'carrier generation' mode in FIG. 7, a signal generator 430 supplies an oscillating signal to one input of a differential driver 440, the other input of which receives provide modulation control signals D (FIG. 3) on line 1559 from the controller (40 in FIG. 3) of the NFC communicator to control the amplitude of the complementary pulses that the differential driver 440 provides to the antenna circuitry 19. In this mode, the controller 40 typically uses the modulation control signals D (see FIG. 3) sent to the differential driver 440 to alter the signal level and/or modulation depth of the binary data to be sent (a predetermined pattern of '1's and '0's). The modulation depth may vary from, for example 10% to 100%. The RF signal may be generated by, for example sine synthesis, in which case the signal generator 430 will provide a pulse-width modulated or pulse-density modulated digital signal to the differential driver 440.

In the 'load modulation' mode where the NFC communicator is acting as a target, an externally generated magnetic field induces an AC voltage across the antenna circuitry 19 and a predetermined pattern of binary data representing the data to be communicated is supplied from a controller output (Do in FIG. 3) on line 1011 to the control gate of an IGFET transistor 1003 of known on-resistance to switch the transistor on and off in accordance with the data to be communicated thereby changing the impedance across the antenna circuitry and thus modulating the load on the antenna circuitry of the initiating NFC communicator.

An NFC communicator may additionally comprise a modulation controller which, for example, controls the amplitude of a transmitted RF signal in accordance with the proximity of another near field RF communicator.

An NFC communicator may also have data parsing, framing, parity and CRC error detection functionality.

FIG. 8 shows an example list of sample commands to which an NFC communicator may respond. As set out above the protocol under which the NFC communicator communicates may depend upon the particular application. Where the NFC communicator is to transmit data representing a transport ticket, RF modulation, data frames and communication protocols in accordance or compatible with ISO/IEC 14443A may be used. ISO/IEC 14443A lists certain commands that all compatible devices must be capable of responding to, for example the request command REQA and the wake up command WUPA. Apart from these mandatory commands, in the example commands (read ID (RID), read all data (RALL), read a single byte (READ), write-with-erase (WRITE-E) and write-no-erase (WRITE-NE) given in FIG. 8, 8-bit operand frames follow all commands. These 8-bit frames are based upon the 7-bit short frame but have an additional data bit. An example operand frame is shown in FIG. 8.

A CRC (Cyclic Redundancy Check) may also be included in each part of the command and response sequence. If the CRC received by the other near field RF communicator does not match the one generated as data arrives, then the device will halt the operation and move to a 'Command End' status waiting for the next command. This provides additional verification of the communication between two devices. Examples of CRCs which can be used will be clear to the skilled man. For example the CRC may be a 16-bit version as specified under CRC-CCITT—for definition see ISO/IEC 14443-3:2001(E) Annex B: CRC_B.

FIG. 9 shows a sample command-response summary table. The command column shows sample commands that may be sent to an NFC communicator from, for example, an RFID reader. The table is sub-divided into nine columns to show the operand frames that follow each command frame. The response column shows what response the NFC communicator will give to each of the received commands.

Operation of a device embodying the invention will now be described with the aid of FIGS. 10 to 16.

Figure 10:
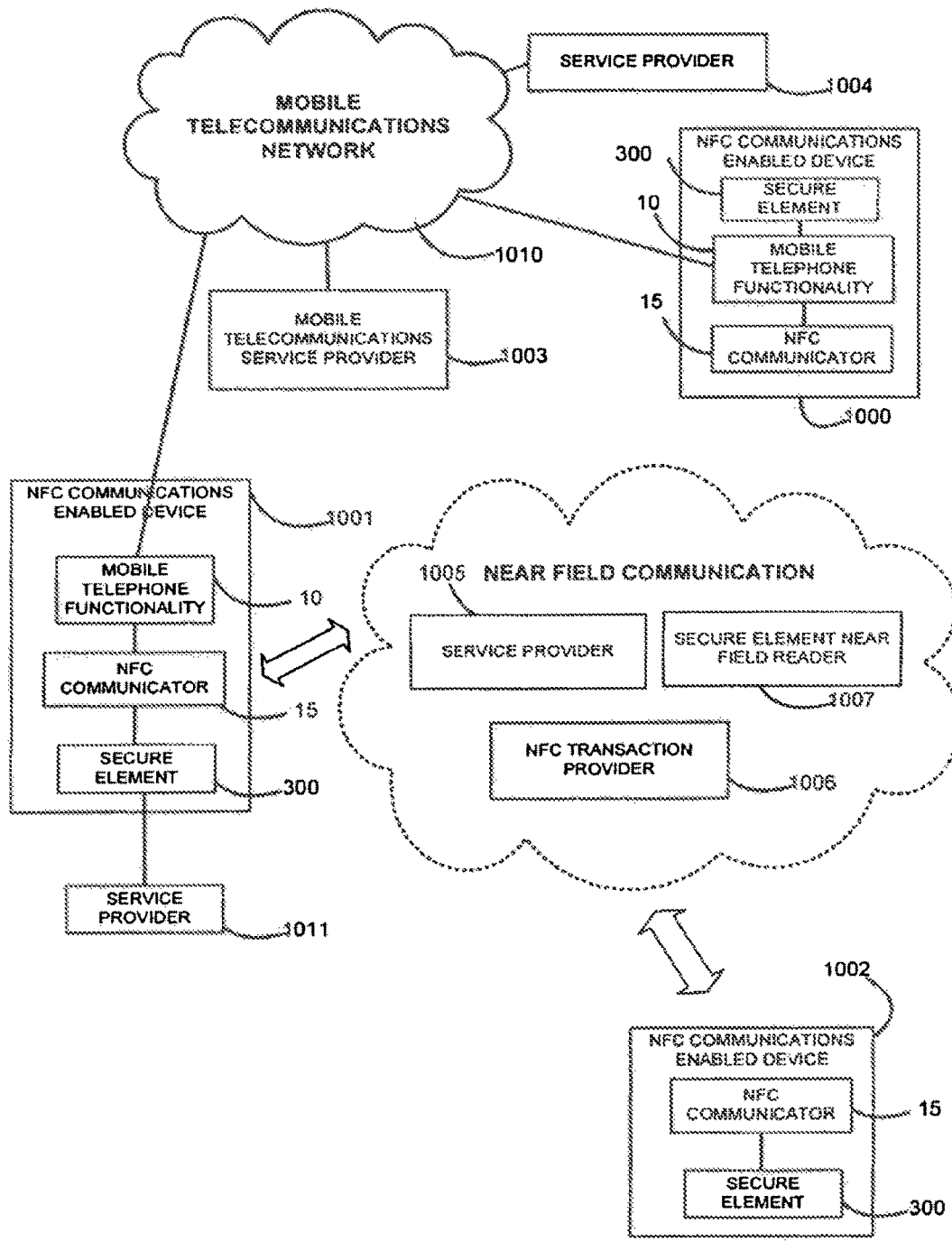
FIG. 10 shows a diagram to illustrate a communications system comprising a device embodying the invention.

FIG. 10 shows a very schematic diagram for use in explaining the operation of different examples of implementations of devices embodying the present invention. Thus, FIG. 10 shows three different examples of devices embodying the present invention. Devices 1000 and 1001 each have mobile telephone functionality 10, an NFC communicator 15 and a secure element 300 as discussed above. The secure element 300 may be any of the different types of secure element described above. The device 1000 is similar to the devices 1 and 1' described above in that the secure element communicates with the NFC communicator via the mobile telephone functionality, in particular the controller 20, while device 1001 differs in that communication between the secure element 300 and the mobile telephone functionality 10 is via the NFC communicator 15. The other device 1002 shown in FIG. 10 is different in that it comprises solely an NFC communicator and a secure element that communicates with the NFC communicator that is there is no mobile telecommunications functionality. The other device 1002 may have functionality other than mobile telecommunications functionality, in addition to its NFC communications functionality. The devices 1000 and 1001 are able to communicate secure data, via the mobile telecommunications network 1010 (which for simplicity is illustrated as a cloud rather than a cellular arrangement of base stations) with one or more service providers, as shown a mobile telecommunications service provider 1003 and a transaction service provider 1004, at least the latter of which is capable of providing any of the devices 1000, 1001 and 1002 with an operating system and/or an applications platform and/or transaction data for a secure element via the telecommunications network in a secure manner, that is, for example, encrypted, for example by public/private key.

Each of the devices 1000, 1001 and 1002 is able to communicate by near field communication with any compatible near field RF communicators. FIG. 10 shows a service provider 1005 capable of communication by near field communication to, for example, provide any of the devices 1000, 1001 and 1002 with an operating system and/or an applications platform and/or transaction data for a secure element, an NFC transaction provider 1006 capable of providing any of the devices 1000, 1001 and 1002 with transaction data for storage on a secure element and a secure element near field reader 1007 capable of reading by near field communication transaction data from the secure element of any of the devices 1000, 1001 and 1002 and of acting in accordance with the read transaction data. An operating system and/or an applications platform and/or transactions data for a secure element may also be communicated through a wire or other contact-based link or a wireless link between the device and a service provider such as service provider 1011 in FIG. 10, for example through electromagnetic coupling, inductive coupling, capacitive coupling, radio frequency coupling such as a Bluetooth radio link, optical coupling, infrared coupling. Again, the data will generally be secure data that is, for example, encrypted for example by public/private key.

Figure 11:
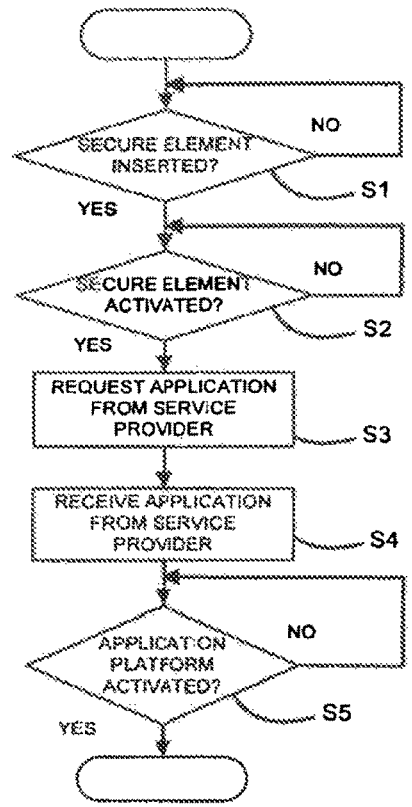
FIG. 11 shows a flow chart for illustrating operations of a device embodying the invention during installation of a secure element.

FIG. 11 shows a flow chart representing processes carried out by a device 1, 1', 1000, 1001 or 1002 to activate a secure element 30, 31 or 300. Where the device is a mobile telephone and as in FIG. 1 the secure element is a SIM card for the mobile telephone, then the SIM card will carry the usual user and operational data required by the mobile telephone user to operate the mobile telephone. As mentioned above, the SIM card may be provided with the mobile telephone or separately from the mobile telephone. To activate the mobile telephone, the user inserts the SIM card into the mobile telephone and then requests activation. Where the secure element is a different type of secure element, the user may simply insert the secure element to initiate activation. When the mobile telephone detects insertion of a secure element at S1, then the secure element is activated at S2. The activation process will usually require verification of the mobile telephone and user details and the SIM card by the mobile telecommunications service provider 1003 via the mobile telecommunications network in order to activate the mobile telephone. The SIM card can now be used as a secure element in accordance with the present invention. Where the secure element is not a SIM card, then insertion of the secure element into an appropriate slot in the device 1', 1000, 1001 or 1002 may launch software on the secure element or in the device to activate the secure element.

As set out above, the secure element (whether a SIM card or other secure element) may be pre-loaded with an applications platform. As another possibility or additionally, at the user's request or as a result of some action by the user, a service provider may be requested at S3 to activate a pre-installed applications platform or download an applications platform onto the secure element. For example, the device user may wish to make payment transactions using his device and may go into a bank to request a suitable payment applications platform to be inserted onto the secure element. As another possibility or additionally, the user may wish to use the device as a credit card and may request that VISA (Registered Trade Mark) or MasterCard (Registered Trade Mark) or some other similar credit card company activates or loads a credit card applications platform (for example an EMV platform) onto the secure element. As another possibility or additionally, the user may wish to use the device as a ticket or access pass and may request a transport service provider or access service provider to activate a transport applications platform. For example, both a transport applications platform and a payment applications platform may be activated or loaded onto the secure element.

The manner in which the applications platform is activated or downloaded will depend upon the circumstances. For example, an applications platform may be activated or downloaded via the telecommunications network where this is available to the device, or via near field RF communication, or by supply of an activation code that the user keys into their device and so on.

When an applications platform is received at S4, then the device checks for correct activation at S5. Once this has been completed, the secure element and its applications platform are ready for use.

Figure 12:
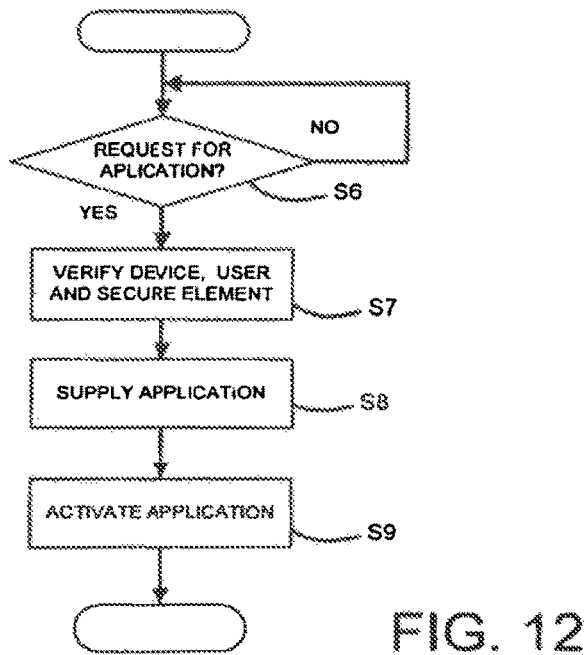
FIG. 12 shows a flow chart for illustrating operations of a service provider to install an applications platform on a secure element of a device embodying the invention.

FIG. 12 shows a flow chart illustrating an example of processes carried out by a service provider in response to a request for an applications platform. Thus, when at S6 the service provider (for example the service provider 1004, or 1003 or the near field communications service provider 1005) receives a request for an applications platform, the service provider verifies the device, user and secure element at S7. Verification of the authenticity of the device (which may be a mobile telephone), the user and the secure element may involve the input of pin numbers and/or messages (for example text messages in the case where the device is a mobile telephone) to which the user must reply. Assuming the verification process is satisfactorily completed, then at S8 the service provider loads the applications platform onto the device using an appropriate JAVA-enabled applet, MIDlet or other software program as discussed above. Once the service provider has determined by communications with the device (via the mobile telecommunications network or near field communications as appropriate) that the installation has been successful, then it activates the applications platform at S9 to enable the user of the device to carry out a transaction using that applications platform, for example a payment transaction if the applications platform is a payment applications platform or a transport ticket transaction if the applications platform is a transport applications platform.

As mentioned above, the applications platform may be loaded onto the secure element via the mobile telecommunications network, via a near field communications enabled service provider such as service provider 1005, or through a wired or wireless link between the device and a service provider such as service provider 1011 in FIG. 10. Once the application platform has been loaded and activated (S5 in FIG. 11 and S9 in FIG. 12), the service provider has control of that platform and can then use the platform for specific application data applications.

Operation of a device embodying the invention will now be described where the installed applications platform is a transport platform and the user of the device wishes to buy a train or other transport ticket. The ticket itself may be bought, using an installed payments platform, from a service provider via any of the mechanisms mentioned above, for example via the mobile telecommunications network or via near field communication from for example a near field RF communicator at a ticket office or another vending facility, and then installed onto the secure element directly or via the controller 20, depending upon the device architecture. As another possibility, the appropriate vending facility may provide the ticket in the form of data that the user enters via the user interface of the device together with a user or ticket ID or an authorization code. As another possibility, the ticket may be supplied in the form of a near field RF transponder or tag at a point of sale such as a ticket office or with the device (for example as a promotional item) and the ticket data then downloaded by near field communication to the NFC communicator of the device. As another possibility as discussed above, the ticket may be purchased via the Internet and downloaded from a local outlet, for example by NFC communication, once the local outlet has verified payment, for example using a payments applications platform of the secure element. The transport applications platform installed on the secure element will then load the received train ticket data onto the already established transport platform. Loading of the ticket data will result in the loading of a memory map onto the SIM card which is specific to the relevant electronic ticket being purchased. Loading will only occur once the mobile telephone has been authenticated and payment has been processed for the ticket.

The way in which the secure element is loaded with data will depend on the type of secure element, the way in which the secure element is provided and the purpose for which it is provided. For example the procedure described above with respect to FIGS. 12 and 13 may be used where the secure element is a SIM card within a mobile telephone whereas where the secure element is a secure card such as an SD card, then that card may be provided programmed as described above or pre-programmed with a specific application platform or platforms and only specific application data loaded during use. Likewise the mechanism by which data is loaded on to the secure element will vary depending on the secure element.

Figure 13:
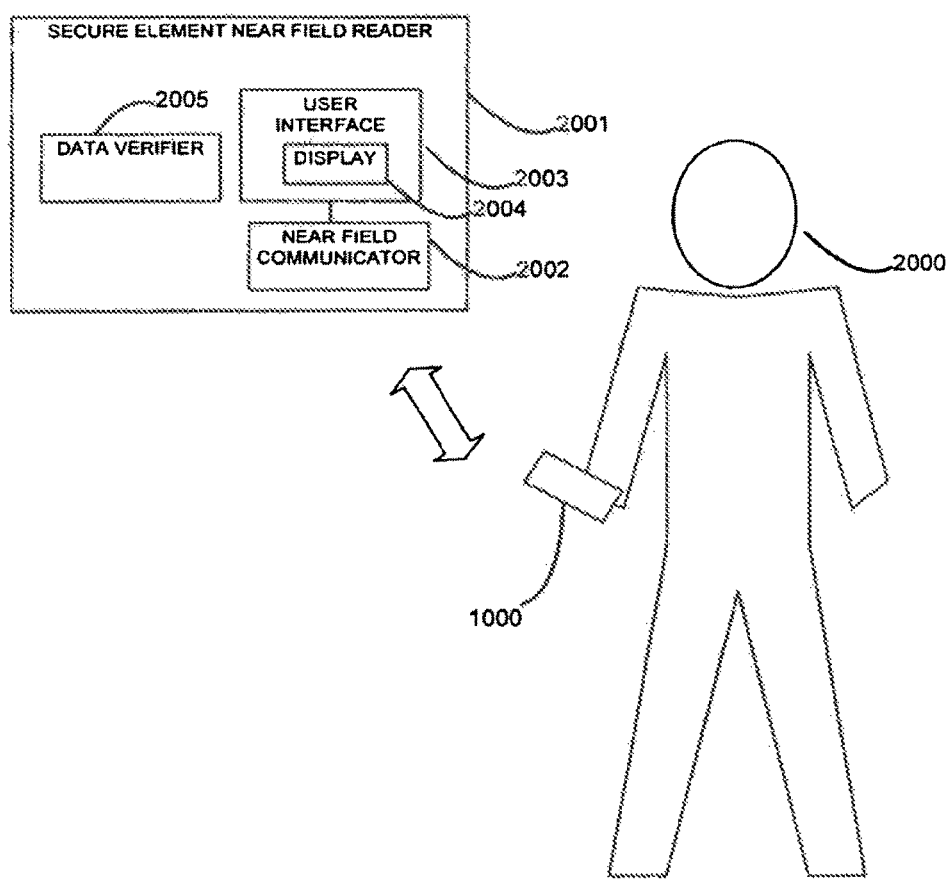
FIG. 13 shows a diagram to illustrate use of a device embodying the invention carrying a secure element storing transaction data such as ticket.

The manner in which a device embodying the invention having a secure element upon which is installed a transport applications platform and ticket data is used to gain entry with that ticket will now be described with the aid of FIG. 13 which shows a very schematic representation of a user 2000 having a device embodying the invention (as shown the device 1000 shown in FIG. 10, although it could be any of the devices described above) in front of a secure element near field reader 2001 incorporating a near field RF communicator 2002 which may be in the form of an NFC communicator similar to that shown in FIG. 3 but probably without the secure element and associated with a user interface 2003 having a display 2004 to display information and instructions to the user. The controller of the near field RF communicator may be a secure controller configured to decrypt and verify ticket data received from a user's device by near field communication or may be coupled to a separate secure data verifier 2005 configured to decrypt and verify ticket data. Such a data verifier 2005 may, as shown, be part of the reader or may be remotely located. Although not shown in FIG. 13, the reader 2001 may automatically control an access gate to give the user of the device access to a ticket controlled area only in the event received ticket data is validated. For example the access gate may allow access to a platform or waiting area. As another possibility, the reader may not be an automatic access controller but may be a portable device carried by an attendant, ticket inspector or usher who allows access only when the ticket data is verified.

Figure 14:
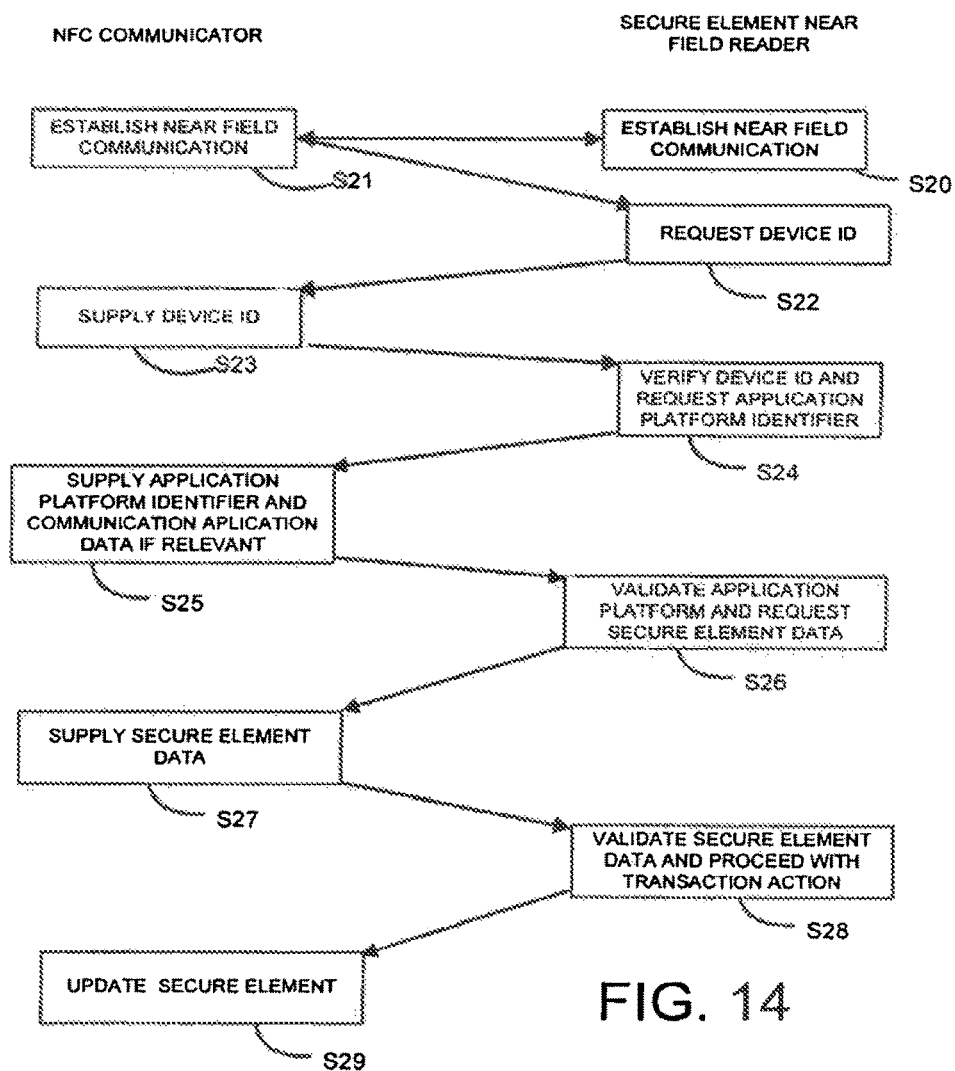

FIG. 14 shows a flow chart illustrating operations carried out by the user's device 1000 and the reader 2001. These operations will be explained for the case where the device is a mobile telephone embodying the invention having a secure element such as its SIM card carrying train ticket data and the reader is at a transport gate. It will however be appreciated that similar operations will occur for any device embodying the invention and any transaction data.

The user 200 takes the telephone with its secure element programmed with the ticket data to the relevant train station and presents the mobile telephone to the reader 2001 on the transport gate.

Figure 15:
FIG. 15 shows a ticket structure.

An example of the ticket data carried by the secure element is shown in FIG. 15. The ticket data or ticket identifier consists of a header specific to the secure element, a payload which will contain the device ID and applications platform ID and a message authentication code (or "MAC"). The MAC is created by an internally stored algorithm of the secure element and is intended to be checked by the reader at each communication so as to ensure the authenticity of the device and the communication. The ticket header will store data specific to the relevant ticket, for example 1 day ticket from Reading station to London Station.

The reader 2001 polls or looks for NFC communicators by transmitting a wake-up RF signal. When the mobile telephone (with secure element and NFC communicator) is in read range of the reader 2001, the wake-up RF signal initiates the near field communication (S20 in FIG. 14). The wake-up signal may also provide operating power to the NFC communicator of the mobile telephone. The NFC communicator responds at S21 with a suitable wake-up response, for example as provided in ISO/IEC 14443A.

On receipt of the wake-up response, the near field RF communicator modulates its transmitted RF field with data representing a device ID request command to request identification of the NFC communicator at S22. The NFC communicator responds by modulating the transmitted RF field with data representing the MAC and an identifier or device ID specific to the mobile telephone and operating system at S23. On receipt of the device ID the data verifier or reader decrypts, verifies and authenticates the provided MAC and device ID and, provided the device ID is accepted (for example is in compliance with the reader operating protocols), then the reader requests supply of an applications platform identifier for each platform accessible to the NFC communicator at S24.

On receipt of the request, the NFC communicator responds with the MAC and applications platform identifier(s) for the platform(s) it has access to. These applications platforms may be stored within the NFC communicator's own data store but are preferably stored on the secure element of the device. As an example, where the secure element has a transport applications platform loaded on to it, the identification data specific to that transport platform will be supplied to the NFC communicator by the secure element (either directly or indirectly via the controller of the mobile telephone, depending upon the architecture of the device) and the NFC communicator then causes the transmitted RF field to be modulated in accordance with that supplied applications platform identifier at S25.

On receipt of the applications platform identifier, at S26 the data verifier or reader decrypts, verifies and identifies the MAC and applications platform and, provided the applications platform identifier is accepted, modulates the RF field with a request for transaction data, in this example a request for ticket detail data.

Where the mobile telephone user has bought a ticket, the data for the ticket will have been loaded on to the transport applications platform on the secure element. Accordingly at S27, following receipt of a request from the reader, the NFC communicator of the mobile telephone supplies the request to the secure element (either directly or indirectly through the mobile telephone controller depending upon the device architecture), retrieves the ticket data and then responds to the reader by modulating the RF field with the MAC and ticket data.

At S28, the data verifier or reader decrypts, processes and verifies the received data and, where the ticket data is accepted, permits access through the ticket gate. In this example, the reader validates the ticket and allows access either by automatically opening the transport gate or barrier or by informing an operator or ticket inspector that the ticket is valid. The reader may, at the same time supply data or commands to the NFC communicator to indicate ticket status or to deduct a sum of money from a ticket account. For example, where the reader is allowing entrance (such as entrance to an underground station or train platform), then the reader may communicate, via the NFC communicator and possibly the mobile telephone controller, data to be stored by the secure element in a writable area of its memory to indicate that the ticket is in use whereas where the reader is allowing exit then the reader may communicate, via the NFC communicator and possibly the mobile telephone controller, command data to cause the secure element to cancel the ticket, to reduce the number of available journeys by one or to deduct a sum of money from a total stored by the ticket data, or to log the transaction in some way, for example to provide a time stamp related to, for example, the date of issue, expiry date (where the current time and/or date may be derived from the mobile telecommunications network, for example when the ticket is purchased), as appropriate. The NFC communicator or the mobile telephone controller will cause this data to be written to the secure element, so altering the data held by the secure element at S29 in FIG. 14.

As part of the communications process, the reader may also supply ID information or for example a media identification code. This may be used, depending upon the device architecture, by the NFC communicator, mobile telephone controller or secure element controller to determine, for example, the authenticity of the reader and/or its authority, for example, to request the device to carry out a certain action or command, to change data stored by the secure element, to receive data from the secure element and so on. For example the NFC communicator may refuse to communicate any data unless the external device is verified and at S29 in FIG. 14 the secure element (or NFC communicator or mobile telephone controller depending upon the architecture) may refuse to accept any instruction to delete contents of the secure element where that instruction is received from an external device or where that instruction is received from an un-verified external device.

The device may, for example where the device is a mobile telephone or PDA or laptop, be configured to provide, via the user interface, a user with the capability to view data and/or applications stored on the secure element. For example the mobile telephone PDA or laptop processor or NFC communicator controller, depending upon the device architecture, may be configured to control access to the secure element and through its interface with the secure element enable the user to select secure element or contents within the secure element from a menu service provided by the device user interface on the mobile telephone or PDA or laptop for display in a user friendly format by a display of the device user interface.

As another possibility, the contents or certain of the contents of the secure element may automatically be displayed to the user, or a menu indicator may appear to indicate the secure element contents once the secure element has been inserted into the device or activated. The user may be given the option of turning off the display or menu indicator.

As a further example, the user control may extend to the ability to delete the contents or certain of the contents (for example only data defined as user accessible) of the secure element by the user. The user may also be given limited modification rights to modify the contents of the secure element (for example to change personal access codes). However, the user will of course generally not be given rights to change transaction data, for example once a user has bought a particular train ticket, the user should not be able to modify that train ticket or change the data stored on the secure element in relation to that train ticket.

Figure 16:
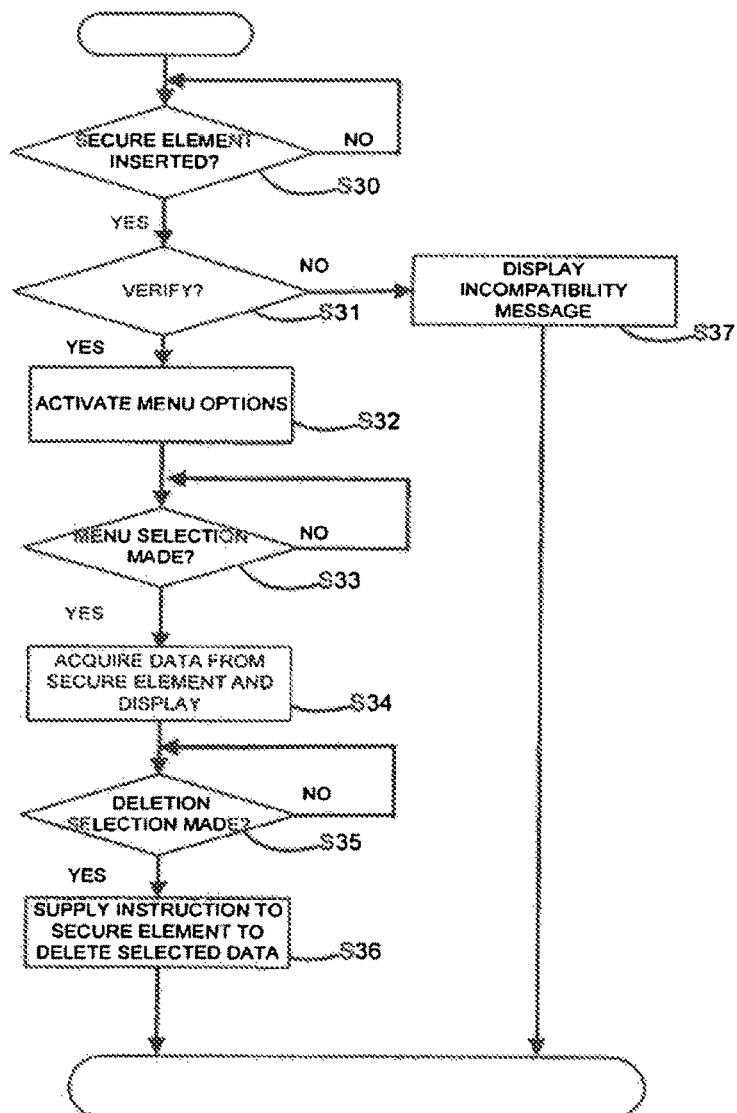
FIG. 16 shows a flow chart for illustrating operations carried out by a device embodying the invention to delete data such as transaction data under user control.

FIG. 16 shows an example flowchart illustrating user intervention with a secure element. In the example of FIG. 16 the secure element is a removable secure element such as an SD card and the device is a mobile telephone. In this illustrative example, the removable secure element holds several different tickets which the user has purchased, these tickets being for, for example, different venues and events.

When at S30 in FIG. 16 the user inserts the removable secure element into the mobile telephone, the removable secure element interfaces with the mobile telephone controller. This interface may as discussed above be an ohmic contact via electrical contacts which mate with corresponding contacts within the mobile telephone or a wired or wireless link.

Following insertion of the removable secure element at S30, the mobile telephone controller requests identification and authentication data from the removable secure element and verifies the authenticity of the removable secure element and the compatibility of the removable secure element with its own internal protocols and set-up at S31. If authentication or compatibility is not achieved, the mobile telephone controller will cease communicating with the removable secure element and will at S37 display a message to the user indicating that the removable secure element is not compatible.

Once the removable secure element is authenticated, at S32 the mobile telephone controller activates menu options (which were not previously displayed or were inactive or "greyed out") so that the user can view these menu options on the display in similar fashion to other mobile telephone menu options.

The mobile telephone controller then waits at S33 for a user menu selection from the available menu options. As an example, if the user wishes to view the contents of the removable secure element, for example if the user wishes to see the number of transactions such as tickets held on the removable secure element, the user may select an option to view the transaction contents data of the removable secure element. Following selection, the mobile telephone controller requests the appropriate data from the removable secure element and converts it into a form which can be displayed on the mobile telephone display at S34. The data displayed will depend on the contents of the removable secure element, for example the display may simply list the number of transactions, for example tickets, available, it may provide details on the transactions (for example ticket venue, date etc.).

Should the user wish to delete data, for example where a ticket has expired, the user may then select the particular item on the display screen and request deletion using the menu options. When at S35 the mobile telephone controller receives a user instruction to delete transaction data, then the mobile telephone controller at S36 supplies a delete instruction to the removable secure element at S36 and the removable secure element checks the authority to delete and if the user has this for this data either actually deletes the corresponding data in its entirety or deletes its identifier and unlocks the relevant section of memory so that it is free to be overwritten. The data will then no longer be available on the removable secure element.

In the description with reference to FIG. 16, it is the mobile telephone controller which communicates with the user via the user interface. Depending upon the device architecture it could be the NFC controller.

Figure 17:
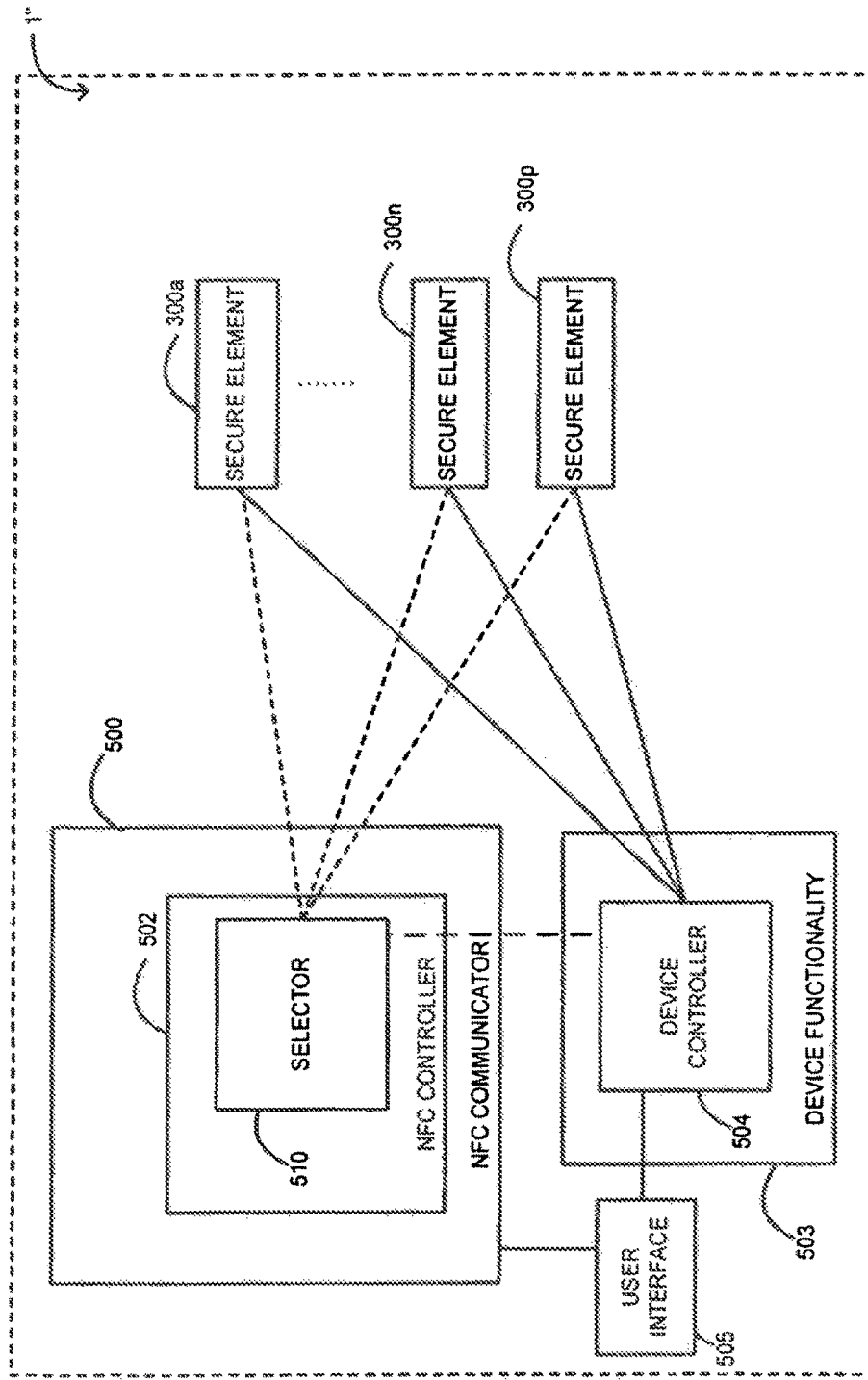
FIG. 17 shows a simplified diagram of another example of a device embodying the invention having two or more secure elements.

In the above described examples, a device has a single secure element. FIG. 17 shows a functional block diagram of a device 1" embodying the invention that is capable of receiving a number of secure elements (three 300a, 300n, 300p are shown as an example) each of which may have a different operating system and different applications platforms which, as described above, may be pre-stored or supplied via a communications facility of the device or the NFC communicator of the device. Each of the secure elements may communicate in accordance with different secure interface protocols, examples of which are S2P and SWC. The device 1" has, like the devices described above, an NFC communicator 500 with an NFC controller 502 and may have device functionality (for example mobile telephone functionality) 503 with a device controller 504, and a user interface 505. These features of the device 1" may have any of the configurations described above. The device 1" differs from those described above in that the NFC controller is configured to provide a selector 510 that is capable of selecting the appropriate secure element for communication with an external near field RF communicator on the basis of, for example, user selection of a secure element via a user interface (generally a menu on a display) of the device. Thus, for example, where the device has different secure elements for different transactions, when the NFC communicator is activated by a polling reader, the controller of the device may cause its display to display to the user a menu listing the available secure elements so that the user can select the appropriate one on the basis of information displayed at or in association with the reader with which the NFC communicator is communicating. Upon receipt of the user selection, the NFC controller (possibly upon instructions from the device controller, depending upon the architecture) causes the selector or switch 510 to couple the appropriate secure element to the device controller 504 (as shown in solid lines in FIG. 17) where the controller 504 communicates with the secure elements or to the NFC controller 502 (as shown in dashed lines in FIG. 17) where the NFC controller 502 communicates with the secure elements and the NFC controller communicates with the device controller 504.

As another possibility or additionally, where a secure element has a large number of applications platforms, the user may be given a menu option to select a platform.

In the alternative the user may control both the selection of the secure element and use of NFC communicator. For example where the user approaches an access gate, for example to a train station platform, the user may select NFC communication on the communicating device (for example a mobile phone). Selection may be made via a user interface (generally a menu on a display) of the device. This will activate the NFC communicator within the device. As a result of such selection the user interface will then show the transaction data available, for example one day return train ticket from Reading to London, bus ticket from London to Gatwick. The user then selects the transaction data required, thus selecting the relevant secure element and application platform. Once selected the NFC controller or device controller causes a selector or switch (510 in FIG. 17) to couple the appropriate secure element.

Figure 18:
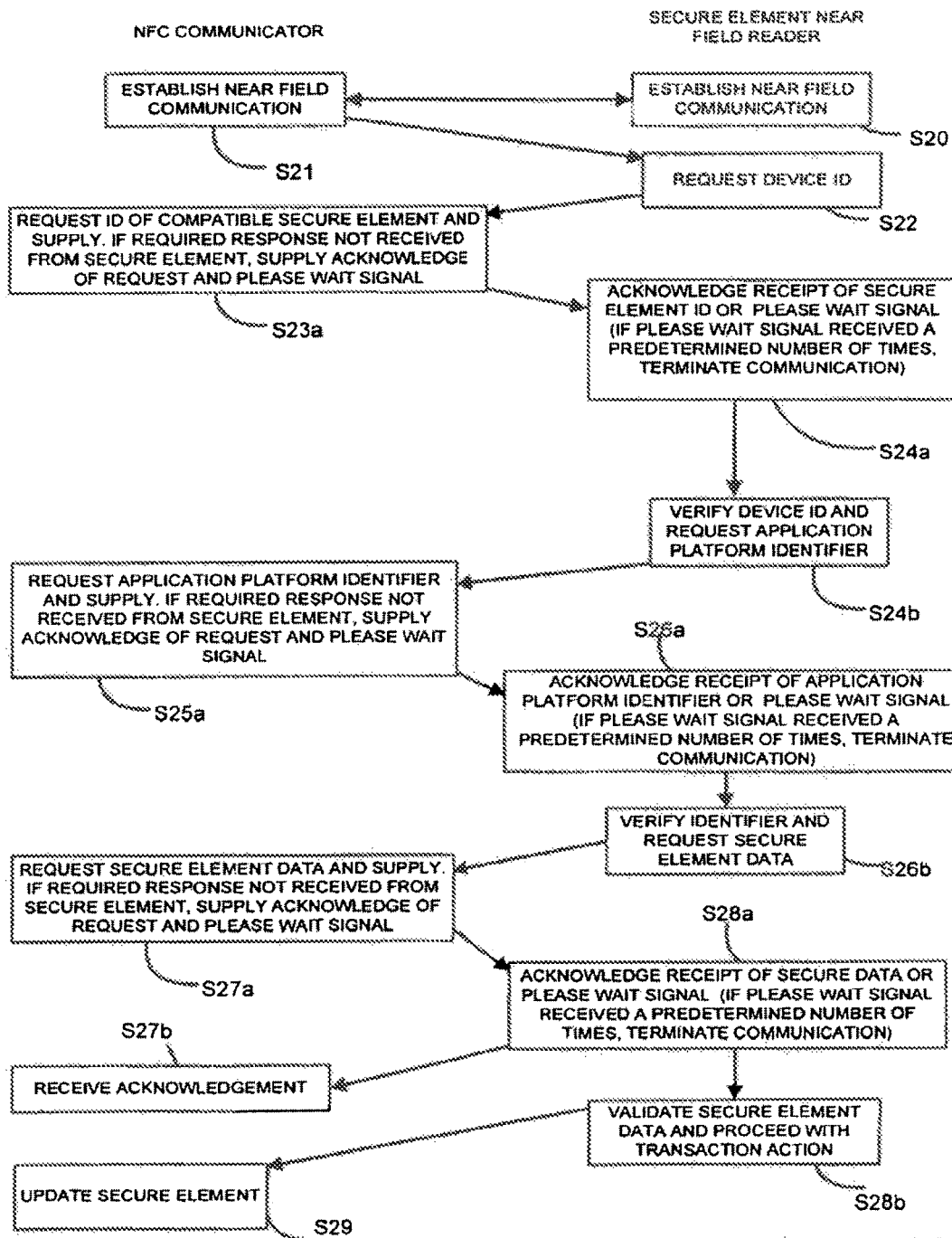
FIG. 18 shows a modified version of the flow chart shown in FIG. 14.

Near field communication between near field communicators is generally a synchronous process. However, once communication with a secure element or elements and/or a device controller is required, inevitably an asynchronous component is provided in the communications chain. Near field communication requires very precise timing for responses to requests and, if a response is not received within the defined response period, the communications may be terminated. FIG. 18 shows a modification of the communications process shown in FIG. 14 to address this issue. The communications process shown in FIG. 18 may be used where there is one or more than one secure element.

The communications process of FIG. 18 differs from that shown in FIG. 14 in that whenever the reader requests a response from the NFC communicator, the NFC communicator times the delay in receiving a response from the secure element and if it is not received in time to respond to the reader within the required response period, the NFC communicator responds with an acknowledgement and please wait signal. The NFC communicator may repeat the acknowledgement and please wait signal if it has still not received the data from the secure element and the reader may time out the communication if this has occurred a predetermined number of times, for example three. In other respects the communications process of FIG. 18 is the same as that of FIG. 14.

Thus on receipt of the wake-up response, the near field RF communicator again modulates its transmitted RF field with data representing a device ID request command to request identification of the NFC communicator at S22. The NFC communicator responds by requesting the data from the secure element. The NFC communicator times the delay in receiving a response from the secure element and if it is not received in time to respond to the reader within the required response period, the NFC communicator responds with an acknowledgement and please wait signal, otherwise the NFC communicator sends the data (S23a). If the reader receives a please wait signal it checks to see if this has been received a predetermined number of times, for example three, and if so terminates the communication at S24a. If the data is received in time then the reader verifies it at S24b as described above with respect to S24 in FIG. 14 and requests supply of an applications platform identifier for each platform accessible to the NFC communicator.

On receipt of the request, at S25a the NFC communicator requests the data from the secure element. The NFC communicator times the delay in receiving a response from the secure element and if it is not received in time to respond to the reader within the required response period, the NFC communicator responds with an acknowledgement and please wait signal, otherwise the NFC communicator sends the data. If the reader receives a please wait signal it checks to see if this has been received a predetermined number of times, for example three, and if so terminates the communication at S26a. If the data is received in time then the reader verifies it at S26b as described above with respect to S26 in FIG. 14 and requests supply of the secure element.

On receipt of the request, at S27a the NFC communicator requests the data from the secure element. The NFC communicator times the delay in receiving a response from the secure element and if it is not received in time to respond to the reader within the required response period, the NFC communicator responds with an acknowledgement and please wait signal, otherwise the NFC communicator sends the data. If the reader receives a please wait signal it checks to see if this has been received a predetermined number of times, for example three, and if so terminates the communication at S28a. If the data is received in time then the reader verifies it at S28b as described above with respect to S28 in FIG. 14 and the process proceeds as described above with respect to FIG. 14.

This modification gives the NFC communicator time to identify the compatible secure element without the reader terminating the near field communication.

As another possibility, once the secure element has been selected and coupled to the NFC communicator the NFC communicator may download all relevant data from the secure element in one go and following receipt of a request for data from the external near field RF communicator. In such an example the NFC communicator may only need to respond with an acknowledgment and please wait signal for the first data response.

As described above, where the device has mobile telephone communications facilities it is a mobile telephone or a PDA or laptop. It could however be any device that has mobile telephone communications facilities. As described above, a device need not necessarily have communications facilities in addition to the NFC communicator. Where a device has communications facilities in addition to the NFC communicator, then that device may have other communications facilities in place or in addition to mobile telephone communications facilities, for example any one or more of radio communications facilities such as Bluetooth or longer range radio communications facilities, fixed or land line telephone communications facilities, or optical or infrared communications facilities.

As described above a secure element may be: pre-programmed with at least one of an operating system, applications platform and transaction data; receive at least one of an operating system, applications platform and transaction data (or modifications or updates thereto) via a communications facility which may or may not be a near field communications facility or a mobile telecommunications facility; or any combination of these.

As described above, generally data will be secured by, for example public/private key encryption or security algorithm, where the communication is external to the device and where the communication is with a secure element. A secure element may use any appropriate encryption algorithm to secure data, provided of course that this can be decrypted by the eventual legitimate reader.

The NFC communicator (for example the NFC communicator 15 in FIG. 3) may be implemented as an integrated circuit connected to any peripherals and an antenna. Within the integrated circuit there will be analogue and digital domains—the proportion of each of these domains will depend on the integrated circuit. Likewise some of the functionality may be carried out in software within the controller of the NFC communicator. As another possibility, the NFC communicator may be incorporated or comprised within other suitable formats, for example the NFC communicator may be implemented on a PCB board. Where appropriate, the integrated circuit or other format may be a stand-alone device, for example the NFC device may be incorporated into a label, electronic token, transport ticket or access card.

An NFC communicator may be set up to operate in either initiator or target mode as default. The change in mode of operation may be due to operation of a larger device, receipt of an externally generated RF signal by the NFC communicator or as a result of some instruction received from within the NFC communicator. For example the NFC communicator may operate as default in target mode to conserve power; it may automatically switch to initiator mode at certain time intervals or on receipt of a signal, for example from a host device. The switch may also occur as the result of the detection of an externally generated RF field, for example by an active tag system. As an alternative, the NFC communicator could operate as a default in reader-mode but transmit its RF signals at pre-defined intervals rather than continuously. The switch to target-mode may then occur on detection of an externally generated RF signal, for example from another near field RF communicator.

As described above, where a device embodying the invention has device functionality having a controller or processor in addition to the NFC communicator and secure element (for example mobile telephone functionality), the secure element may communicate directly with the NFC communicator or with a controller or processor of that device functionality or any combination of these, depending upon the circumstances. For example in one arrangement described above, where a request for data is received by the NFC communicator, the request will be provided to the controller ("host processor") of the device functionality which will determine the response to be made and the data to be transferred and, where the relevant data is held on the secure element, the host processor will control the transfer of data from the secure element to the NFC communicator which will then transmit the transferred data to the external near field RF communicator. In another arrangement described above, where the NFC communicator has a direct link to the secure element, then relevant data may be transferred directly from the secure element to the NFC communicator and from there be transmitted to the external near field RF communicator. In another arrangement described above, there may be no direct link between any host processor and the secure element and in such circumstances the NFC communicator controller and/or the processor of the secure element will control transmission of data from the secure element.

The NFC communicator controller may interface with the "host processor", for example a mobile telephone processor, and be controlled by such processor.

During any communication between the NFC communicator and an external near field RF communicator various identifications and authentications will occur such as the MAC identification discussed above. The external near field RF communicator may (or may not depending upon the security level required) request authentication/verification of the NFC communicator prior to any transmission of data from the secure element and vice versa. Authentication and verification of any component by another may be required, for example an external near field RF communicator may require authentication and verification of the device, the operating system, applications platform and transaction data prior to any communication of data and any of these may require authentication and verification of an external near field RF communicator prior to any communication of data.

An embodiment provides a mobile telephone or PDA or laptop comprising a secure element and NFC communicator. As another possibility a mobile telephone or PDA or laptop may be operable to interface with a secure element and NFC communicator. One or both of the secure element and/or NFC communicator may be removable from the mobile telephone or PDA or laptop. The secure element may be any secure element described above. The NFC communicator may be any NFC communicator. The NFC communicator or parts of the NFC communicator may or not be integral with components of the mobile telephone or PDA or laptop.

In examples described above, an NFC communicator is incorporated within a larger device. In such a case, the NFC communicator may be a discrete entity within the host device or may be provided by features dispersed throughout or integrated within the host device or a part of the host device. Where an NFC communicator is within a larger device or system, all of the functionality may be comprised within the central processing board of the larger device or system or alternatively split between different processing boards. In addition the functionality of an NFC communicator may be provided by software and/or firmware and/or hardware, as appropriate.

It will be appreciated that the above gives mobile telephones and PDAs and laptops as examples of host devices. A host device may be another type of electrical device such as another portable electrical device such as a portable audio and/or video player such as an MP3 player, an IPOD®, CD player, DVD player or other electrical device.

As used herein "secure element" means any element which is capable of being used to hold secure encrypted information and/or data. Not all of the data held by the secure element need be encrypted. The secure element may be a discrete device that may be removable from the device to enable the addition of extra applications or functionality. As another possibility, the secure element may be integrated with hardware and/or software of the device, for example be integrated with hardware and/or software of, for example, a mobile phone, PDA, lap-top computer or other electrical device.

An embodiment provides an electronic proof carried by a device as described above, where the proof is provided by the transaction data which represents or is associated with at least one of: a transport ticket or pass which may be a single, return, multiple journey or season ticket for example; an entertainment ticket such as a cinema, theatre or sports ticket; a receipt such as for purchase of goods or services; an access pass or key; a permit or coupon; a reservation or booking such as a hotel reservation, a hire car reservation, or a restaurant reservation; a product such as goods or services; a financial product such as a credit card, pin number, debit card, money, loyalty card.

An NFC communicator may be combined with a removable secure element, for example an NFC-enabled SD card or flash memory card, so that the combination is insertable and/or removable from a host device. The secure element may then provide a data store for the NFC communicator. The secure element may share processor power with the NFC communicator or alternatively the NFC communicator may be controlled by the secure element processor. The combined NFC communicator/secure element may be used as a standalone device or alternatively may be inserted into another electrical device or host device, for example a mobile telephone or PDA.

In an embodiment, the controller of the secure element may control at least some of the functionality of the NFC communicator 15 or possibly even a host device, for example the secure element may control aspects of the host device that relate to display of its data.

As described above, the data communicated is transaction data providing or associated with details of a transaction. A transaction may or may not be a financial transaction. A transaction may be a purchase of a product such as goods or services, a ticket or access pass such as a transport ticket, for example an airplane, train, underground, bus, tram, boat, etc. ticket, a ticket for an attraction such as a sporting or other entertainment event, a cinema or theatre ticket, a reservation or booking such as a hotel reservation, a hire car reservation, or a restaurant reservation, and so on. In an embodiment, transaction data stored by the secure element comprises transport data, more particularly data representing a transport ticket, a journey or payment for a journey. In an embodiment transaction data stored by the secure element comprises access data, more particularly data entitling the user of the NFC communicator to have access to a building, location or area.

The secure element operating system, applications platforms and transactions data may be supplied by the same or different service providers. Applications platforms may be hierarchical so that for example there may be a general transport applications platform and specific platforms for different types of transport or for different countries or transport networks.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention.

What is claimed is:

1. A communications device, comprising;
an NFC communicator configured to couple with a near field RF communicator, in near field range, to enable communication of data between the NFC communicator and the near field RF communicator by modulation of a magnetic field;
a modulator configured to modulate an RF signal in accordance with data to be communicated by the NFC communicator;
at least one secure element, having a plurality of memory areas with differing levels of access, configured to provide secure data storage for transaction data relating to a transaction, wherein the levels of access are differentiated by a degree to which the plurality of memory areas are programmable, writable and modifiable; and a controller configured to control operation of the NFC communicator, to read the transaction data from the at least one secure element, and to cause the modulator to modulate the RF signal in accordance with transaction data read from the at least one secure element so as to communicate the read transaction data to the near field RF communicator as proof of the transaction to enable an action related to the transaction to be carried out.

2. The communications device according to claim 1, wherein the at least one secure element is at least one of separate from the NFC communicator, insertable into the device, removable from the device, connectable to the device, and couplable to the device.

3. The communications device according to claim 1, further comprising a communicator configured to communicate other than by near field RF communication.

4. The communications device according to claim 1, wherein the at least one secure element is further configured to write data to a selected memory area of the plurality of memory areas in dependence upon at least one of a route of supply and an identity of a supplier.

5. The communications device according to claim 1, wherein a memory area of the plurality of memory areas is readable by a user but not amendable by the user, and wherein another memory area of the plurality of memory areas is unreadable by the user.

6. The communications device according to claim 1, further comprising a mobile telecommunications communicator configured to communicate via a mobile telecommunications network.

7. The communications device according to claim 1, wherein the NFC communicator is separate from the at least one secure element and the communications device further comprises a mobile telecommunications communicator configured to communicate via a mobile telecommunications network, wherein the controller comprises a mobile telecommunications controller configured to control the mobile telecommunications communicator and to cooperate with the NFC communicator, the mobile telecommunications controller being configured to read the transaction data from the at least one secure element and to cause the NFC communicator to modulate the RF signal in accordance with the transaction data read from the at least one secure element.

8. The communications device according to claim 1, wherein the at least one secure element is at least one of configured to have an operating system and at least one applications platform, at least partly pre-programmed, and at least partly programmable by the controller.

9. The communications device according to claim 1, wherein the controller is further configured to obtain, by communication with another device, at least one of operating software, at least one applications platform for a particular type of transaction data, and transaction data for storage by the at least one secure element.

10. The communications device according to claim 1, wherein the controller is further configured to communicate with another device by at least one of a mobile telecommunications network and near field communication to obtain at least one of operating software, at least one applications platform for a particular type of transaction data, and transaction data for the at least one secure element.

11. The communications device according to claim 1, further comprising a selector configured to select a secure element from the at least one secure element, and an applications platform from amongst a plurality of applications platforms.

12. The communications device according to claim 11, wherein the selector is a user-controllable selector.

13. The communications device according to claim 1, wherein the controller is further configured to send a wait signal to another near field RF communicator while the controller is awaiting data from the at least one secure element, requested by the other near field RF communicator.

14. The communications device according to claim 1, wherein the at least one secure element comprises at least one of a SIM card, a USIM card, a WIM card, a SWIM card, an SD card and a SMC card.

15. The communications device according to claim 1. wherein the transaction data comprises at least one of payment data, product data, purchase data. ticket data, permit data, pass data, booking data, and reservation data.

16. The communications device according to claim 1, further comprising a display element, and wherein the controller is further configured to enable a user to view of at least some of the data stored on the at least one secure element via the display element.

17. The communications device according to claim 1, wherein the controller is further configured to enable deletion of data from the at least one secure element by a user.

18. A method of supplying at least one of transaction data and product data to a secure element, comprising:

coupling an NFC communicator with a near field RF communicator, in near field range;

modulating a magnetic field to enable communication of data between the NFC communicator and the near field communicator;

securely storing at least one of the transaction data and the product data on the secure element, wherein the secure element includes a plurality of memory areas with differing levels of access, and wherein the levels of access are differentiated by a degree to which the plurality of memory areas are programmable, writable and modifiable;

reading at least one of the transaction data and the product data from the secure element; and modulating an RF signal in accordance with the data read from the secure element so as to communicate the read data to the near field RF communicator.

19. The method of claim 18, further comprising securely storing at least one of secure software, secure data, a Java applet and a midlet on the secure element.

20. A communications device, comprising:

NFC communication means for coupling with a near field RF communication means, in near field range, to enable communication of data between the NFC communication means and the near field RF communication means by modulation of a magnetic field;

modulation means for modulating an RF signal in accordance with data to be communicated by the NFC communication means;

secure element means for providing secure data storage for transaction data relating to a transaction, wherein the secure element means include differing levels of access that are differentiated by a degree to which the secure element means are programmable, writable and modifiable; and control means for controlling, operation of the NFC communication means, for reading transaction data from the secure element means and for causing the modulation means to modulate the RF signal in accordance with transaction data read from the secure element means so as to communicate the read transaction data to the near field RF communication means as proof of the transaction to enable an action related to the transaction to be carried out.

* * * * *